US010836863B2

(12) United States Patent
Ray et al.

(10) Patent No.: US 10,836,863 B2
(45) Date of Patent: Nov. 17, 2020

(54) COPOLYAMIDE COMPOSITIONS WITH REDUCED CRYSTALLIZATION RATES

(71) Applicant: Ascend Performance Materials Operations LLC, Houston, TX (US)

(72) Inventors: Jacob G. Ray, Pace, FL (US); Tiffany Hristopoulos, Jacksonville, FL (US); Steven C. Manning, Pensacola, FL (US); Tariq S. Oweimreen, Sterling Heights, MI (US); Scott E. Powers, Rockford, MI (US); Askim Senyurt, Beaverton, OR (US)

(73) Assignee: Ascend Performance Materials Operations LLC, Houston, TX (US)

( * ) Notice: Subject to any disclaimer, the term of this patent is extended or adjusted under 35 U.S.C. 154(b) by 50 days.

(21) Appl. No.: 15/763,316

(22) PCT Filed: Sep. 28, 2016

(86) PCT No.: PCT/US2016/054087
§ 371 (c)(1),
(2) Date: Mar. 26, 2018

(87) PCT Pub. No.: WO2017/058857
PCT Pub. Date: Apr. 6, 2017

(65) Prior Publication Data
US 2018/0298144 A1    Oct. 18, 2018

Related U.S. Application Data

(60) Provisional application No. 62/234,487, filed on Sep. 29, 2015.

(51) Int. Cl.
*C08G 69/36* (2006.01)
*C08G 69/26* (2006.01)
(Continued)

(52) U.S. Cl.
CPC ............ *C08G 69/36* (2013.01); *B32B 7/12* (2013.01); *B32B 27/08* (2013.01); *B32B 27/18* (2013.01);
(Continued)

(58) Field of Classification Search
None
See application file for complete search history.

(56) References Cited

U.S. PATENT DOCUMENTS 4,417,032 A * 11/1983 Khanna ............... C08G 69/265
524/147
4,702,875 A    10/1987 Jennings
(Continued)

FOREIGN PATENT DOCUMENTS

CN            1058244        1/1992
CN          101659743        3/2010
(Continued)

OTHER PUBLICATIONS

International Search Report issued in corresponding International Patent Application No. PCT/US2016/054087 dated Dec. 16, 2016.
(Continued)

*Primary Examiner* — Satya B Sastri
(74) *Attorney, Agent, or Firm* — Kilpatrick Townsend & Stockton LLP

(57) ABSTRACT

A copolyamide composition comprising a statistical copolyamide containing 70-99 wt % of diamine and dicarboxylic acid repeat units and 1-30 wt % of lactam or AA-BB repeat units, whereby incorporation of the comonomer lactam or AA-BB unit reduces the crystallization rate (longer crystallization times) while maintaining (1) high melting point, (2) low potential plate out, (3) low oxygen permeation, (4) high tensile strength and (5) puncture/tear resistance.

22 Claims, 25 Drawing Sheets

(51) Int. Cl.
*C08L 77/06* (2006.01)
*C08K 5/098* (2006.01)
*B32B 27/08* (2006.01)
*C08J 5/18* (2006.01)
*B32B 27/18* (2006.01)
*B32B 27/32* (2006.01)
*B32B 27/34* (2006.01)
*B32B 7/12* (2006.01)
*C08K 3/36* (2006.01)
*C08K 5/20* (2006.01)

(52) U.S. Cl.
CPC .............. *B32B 27/32* (2013.01); *B32B 27/34* (2013.01); *C08G 69/265* (2013.01); *C08J 5/18* (2013.01); *C08K 3/36* (2013.01); *C08K 5/098* (2013.01); *C08K 5/20* (2013.01); *C08L 77/06* (2013.01); *B32B 2250/24* (2013.01); *B32B 2250/44* (2013.01); *B32B 2307/406* (2013.01); *B32B 2307/412* (2013.01); *B32B 2307/518* (2013.01); *B32B 2307/54* (2013.01); *B32B 2307/7244* (2013.01); *B32B 2439/70* (2013.01); *C08J 2377/06* (2013.01)

(56) References Cited

U.S. PATENT DOCUMENTS

| | | | |
|---|---|---|---|
| 5,081,222 A | 1/1992 | Reimann et al. | |
| 5,194,578 A * | 3/1993 | Anton | C08G 69/265 528/335 |
| 5,258,439 A * | 11/1993 | Togashi | C08L 25/18 524/409 |
| 5,399,306 A * | 3/1995 | Follows | D01F 1/10 264/103 |
| 5,434,223 A | 7/1995 | Scheetz et al. | |
| 5,965,652 A * | 10/1999 | El Sayed | C08G 69/28 524/413 |
| 6,040,392 A | 3/2000 | Khanna et al. | |
| 8,119,718 B2 * | 2/2012 | von Benten | C08K 3/22 524/430 |
| 2004/0235987 A1 * | 11/2004 | Fischer | C08K 5/098 523/216 |
| 2006/0235190 A1 | 10/2006 | Hoffmann et al. | |
| 2007/0249783 A1 * | 10/2007 | Miyamoto | C08K 7/04 524/607 |
| 2010/0206459 A1 * | 8/2010 | Miyamoto | C08G 69/265 156/73.6 |
| 2012/0301659 A1 * | 11/2012 | Rao | C08G 69/265 428/97 |
| 2015/0065650 A1 | 3/2015 | Davies et al. | |

FOREIGN PATENT DOCUMENTS

| | | |
|---|---|---|
| CN | 102015842 | 4/2011 |
| CN | 102076751 | 5/2011 |
| CN | 103097434 | 5/2013 |
| EP | 0411774 A1 | 2/1991 |

OTHER PUBLICATIONS

Written Opinion issued in corresponding International Patent Application No. PCT/US2016/054087 dated Dec. 16, 2016.
Search Report issued in corresponding Singapore Patent Application No. 11201802400Q dated Mar. 28, 2019.
Written Opinion issued in corresponding Singapore Patent Application No. 11201802400Q dated May 7, 2019.
Extended European Search Report issued in corresponding European Patent Application No. 16852444.5 dated May 7, 2019.
Brazil Application No. 112018006069-0, Office Action dated Mar. 10, 2020, 5 pages.
Chinese Application No. 201680066802.X, Office Action dated May 6, 2020, 27 pages (10 pages for the original document and 17 pages for the English translation).
Chinese Application No. 201680066802.X, Search Report dated Apr. 27, 2020, 3 pages.
European Application No. 16852444.5, Office Action dated Jan. 28, 2020, 4 pages.
Guan, Crystallization of Polyamide 66 Copolymers at High Supercoolings, Available Online at: https://trace.tennessee.edu/cgi/viewcontent.cgi?referer=https://%20www.google.de/&httpsredir=1%20&article=3749& context=utk_graddisst, Jan. 1, 2004, 284 pages.
Mashko et al., Effect of New Copper-Containing Additives on Thermo-Oxidative Stability of Polycaproamide, International Polymer Science and Technology, vol. 34, No. 1, Jan. 1, 2007, pp. 37-41.
Singapore Application No. 11201802400Q, Written Opinion dated Apr. 6, 2020, 8 pages.
International Application No. PCT/US2016/054087, International Preliminary Report on Patentability dated Apr 12, 2018, 7 pages.

* cited by examiner

COPOLYAMIDE COMPOSITIONS WITH REDUCED CRYSTALLIZATION RATES

BACKGROUND OF THE INVENTION

Nylon6,6 is widely used for injection molding, fiber, extruded profile and film applications. For numerous applications, its rapid crystallization rate and high temperature performance versus other engineering resins (e.g., PET and Nylon6) convey significant advantages. The high melting point, toughness, puncture resistance and oxygen barrier properties of Nylon6,6 give it a special performance profile that other thermoplastics used in film, including Nylon6, cannot achieve. However, a significant disadvantage of Nylon6,6, in regards to film versatility and flexibility, is its rapid crystallization rate (i.e., approximately less than a 10-second semi-crystallization time at 200-220° C. which is maintained until approximately 100° C.). As a result of this rapid crystallization time, which affects (1) blow up ratios, (2) the ability to orient and (3) the ability to thermoform, film manufacturers are limited when using Nylon6,6.

Given the above-noted difficulties associated with processing Nylon6,6 film, producers often extrude pellet blends of Nylon6,6 and Nylon6 to achieve the high melting points required for the desired applications while producing an extruded article with improved processability (i.e., slower crystallinity). However, in the single screw extruder that is employed to melt and produce the final film, it is difficult to produce a homogenous material with hybrid properties between those of Nylon6,6 and Nylon6. This difficulty has been well documented in the literature, where pellet blending and melting in a single screw extruder undesirably leads to heterogeneity in the final extruded article in the form of two melting points instead of the intended single melting point (M. Kohan, Nylon Plastics Handbook, 1995; K. Marchildon, Macromol. React. Eng. 5, 22-54, 2011).

Poor mixing and non-homogeneity result in compromised film clarity, undesirable mechanical properties, and burn through potential in regions that contain the lower melting point polymer. This latter point is demonstrated in FIG. 3, whereby the hot spots and burn through observed in regions of the film was confirmed to be rich in Nylon6 with a melting point of 220° C.

An advantage of Nylon6,6 versus Nylon6, aside from higher thermal performance, is its cleanliness, where in contrast, incorporation of Nylon6 into film can result in thermal reversibility, thereby forming a large amount of caprolactam monomer (M. Kohan, Nylon Plastics Handbook, 1995). This outcome is undesirable as extractable monomer levels are known to adversely compromise safeness and approvals for food contact applications (Food and Drug Administration, HHS, 21 CFR Ch. I, 4-1-02 Edition, 2002). At typical Nylon6 processing temperatures, caprolactam formation relative to the weight of Nylon6 is 7-8 wt %, while in contrast, the copolymers of the present invention exhibit a significantly lower maximum comonomer formation of approximately 1.5 wt %.

As mentioned, Nylon6,6 is commonly used as a substitute for Nylon6 in film applications where higher thermal performance and improved strength are required. However, Nylon6 and Nylon 6-rich copolyamides cover a majority of the nearly 800 million pound nylon market mainly due to their ease of processing (i.e., a slower crystallization rate which improves the ability to stretch and thermoform) and thermal and rheological compatibility for other thermoplastics used in producing multilayer extrusion. Prior to the present invention, achieving all of the functionalities required by a multilayer or monolayer film with a thermal performance greater than Nylon6 had not been possible.

Film is a primary target application area where benefits are observed based on the aforementioned advantages that are enabled by slower crystallization behavior. Key areas include industrial or food applications that require monolayer or multilayer packages. Examples of where monolayer film is used include vacuum bagging/protective films for curing composite structures (i.e., windmill blades for wind energy), cooking bags, and biaxially oriented Nylon which appears in a multilayer laminate structure for items such as coffee packaging and retort pouches. Examples of where multilayer blown film is used include meat and cheese packaging and stand-up pouches, and shrink films for bone-in meats. In addition, slower crystallization behavior, which results in enhanced gloss, clarity, and toughness, finds benefit in monofilament (i.e., fishing line), fibers, and improved surface finish/gloss for filled injection molded articles.

The present invention addresses unmet commercial needs by providing access to copolyamides that exhibit an unexpectedly unique combination of thermal, mechanical, and crystallization properties that cannot be achieved with Nylon6, Nylon6,6 or Nylon 6-rich copolyamide solutions, and melt blends thereof, especially when the invention is directed to applications such as cast and blown film. Valued attributes include high melting point (>220° C.), high toughness, a reduced crystallization rate versus Nylon6,6 and a relative viscosity (>60) and/or molecular weight ($M_n$>18,000 g/mol) that achieves the melt strength required for film applications. The reduced crystallization rates of the copolyamides of the present invention coupled with other advantageous mechanical and thermal properties result in high film transparency, higher blow up ratios, increased thermoformability, and the ability to uni- or bi-axially orient. The Nylon6,6-rich copolymers of the present invention are observed to exhibit improved thermal performance (greater than or equal to 220° C.) with improved cleanliness versus Nylon6 while also allowing for greater functionality and flexibility for film applications. Moreover, these advantages are further supplemented by a slower crystallization rate versus Nylon6 at, for example, approximately 12-15 wt % comonomer incorporation, allowing for even greater flexibility in processing.

The present invention also provides a route to homogenous films with a single melting point, particularly as it relates to potential extractable monomers. In addition, the ability to process nylons at lower temperatures results in lower potential monomer exudation (M. Kohan, Nylon Plastics Handbook, 1995).

SUMMARY OF THE INVENTION

The present invention relates to a statistical copolyamide thermoplastic composition prepared from dicarboxylic acid (diacid) and diamine starting materials that incorporates a comonomer resulting from reaction with a lactam or, alternatively, a comonomer prepared from a different diacid and diamine (referred to herein as "the AA-BB comonomer"). In an exemplary embodiment, the diamine and diacid starting materials are hexamethylene diamine and adipic acid to provide PA66. In another exemplary embodiment, the diamine and diacid starting materials are hexamethylene diamine and azelaic acid to provide PA69. In an exemplary embodiment the lactam comonomer is caprolactam which allows incorporation of PA6 into the polyamide composition. Thus, in particular embodiments, the copolyamide product is a combination of PA66 units and PA6 units in a statistical copolymer that is PA66-s-6 or a combination of PA69 units and PA6 units in a statistical copolymer that is PA69-s-6. In other exemplary embodiments of the invention, the AA-BB comonomer is separately PA6,9; PA6,10; or PA6,I (I=isophthalic acid) such that in particular embodiments, the copolyamide product includes a combination of PA66 units and PA69 units in a statistical copolymer that is PA66-s-6,9; a combination of PA66 units and PA6,10 units in a statistical copolymer that is PA66-s-6,10; a combination of PA66 units and PA6,I units in a statistical copolymer that is PA6,6-s-6,I; a combination of PA6,9 units and PA6,10 units in a statistical copolymer that is PA6,9-s-6,10; or a combination of PA6,9 or PA6,10 units with PA6,I units in a statistical copolymer that is PA6,9-s-PA6,I or PA6,10-s-6,I, respectively. Other particular embodiments of copolyamides of the invention include, but are not limited to, PA66-s-6,12; PA66-s-6,18; PA66-s-9,6; PA66-s-10,6; PA69-s-6,12; PA69-s-6,18; PA69-s-9,6; and PA69-10,6. In an exemplary embodiment, the copolyamide product contains 75 to 99 wt % (such as 80 to 95 wt %, such as 80 to 90 wt %, such as 85 to 90 wt %) of the diamine/diacid repeat units and 1 to 25 wt % (such as 1 to 20 wt %, such as 1 to 15 wt %, such as 1 to 10 wt %, such as 5 to 15 wt %, such as 10 to 15 wt %) of the lactam or AA-BB repeat units. In another exemplary embodiment, the copolyamide product contains 66 to 99 mol % (such as 70 to 95 mol %, such as 75 to 90 mol %, such as 80 to 90 mol %) of the diamine/diacid repeat units and 1 to 34 mol % (such as 1 to 30 mol %, such as 5 to 25 mol %, such as 5 to 20 mol %, such as 10 to 20 mol %) of the lactam or AA-BB repeat units.

Incorporation of lactam or AA-BB comonomers significantly reduces the crystallization rate (i.e., results in longer crystallization times) of a PA66 solution while maintaining the significant benefits of a PA66 solution such as, for example, (1) a high melting point (greater than or equal to 220° C.), (2) lower potential plate out versus PA6 and PA6-s-66 solutions, (3) low oxygen permeation, (4) high tensile strength, (5) puncture/tear resistance, and (6) higher gloss. By combining the desired qualities associated with a PA66 solution with easier processing (slower crystallinity) and cleanliness (e.g., low potential exudation compared to, for example, PA6 and PA6-s-66), the copolymer compositions of the present invention containing, for example, 1 to 25 wt % of a lactam or AA-BB comonomer (e.g., caprolactam and PA69) provide unique and desirable materials for use in various applications, such as, for example, films.

Typically, PA66 has a crystallization rate of approximately 10× that of PA6. Through low statistical incorporation of caprolactam or one or more other comonomers in the backbone, the crystallization rate significantly decreases, even becoming slower than that of PA6 when, for example, approximately 10 to 25 wt %, such as 10 to 15 wt %, such as 12 to 15 wt % of a comonomer, such as a lactam or AA-BB comonomer, is incorporated into the polyamide, which results in increased flexibility and productivity when applied as a film, with attributes such as (1) higher potential blow up ratios, (2) thermoforming potential, and (3) the ability to uni- or bi-axially orient the film. The degree of potential orientation and thermoforming draw increases with the amount of lactam or AA-BB comonomer incorporated in the polyamide copolymer while maintaining the superior thermal performance properties and mechanical properties over PA6. Furthermore, such copolyamides provide a unique and differentiated solution compared to the use of PA66 and PA6 pellet blends. From a processing standpoint, PA66 and PA6 blends must be processed at temperatures greater than 275° C. to allow the PA66 to melt which also results in more caprolactam exudation due to the thermal reversibility of PA6. However, PA66-s-6 copolymers, for example, can be processed at, for example, 230 to 265° C., such as 235 to 260° C., such as 235 to 255° C., such as 240 to 255° C. (a function of comonomer incorporation). Further, the reduced crystallization rate of the copolyamide, such as PA66-s-6, offers more flexibility versus PA66 and PA6 pellet blends (i.e., orienting and thermoforming potential, as mentioned). Regarding performance, a copolyamide such as PA66-s-6, offers more homogenous film with a single melting point and much improved versus pellet blends. The significance of a homogenous film with a single melting point is (1) reduced burn through potential (occurs in blends with PA6 rich areas in the film), (2) improved film clarity/transparency, and (3) improved toughness.

An aspect of the invention is a copolyamide composition comprising 75 to 99 wt % of a repeating diamine and dicarboxylic acid unit and 1 to 25 wt % of a repeating lactam or AA-BB unit, wherein the copolyamide composition has a relative viscosity according to ASTM D789 (9.34) of 60-350 and a melting point greater than 220° C.

In an exemplary embodiment, the copolyamide composition is of Formula (1), Formula (2) or Formula (3) as shown below:

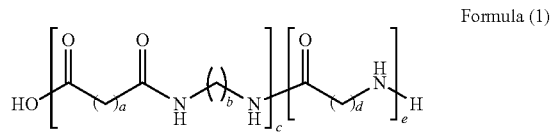

Formula (1)

wherein: a=2-16; b=2-16; c=75-99 wt %; d=2-16; and e=1-25 wt %;

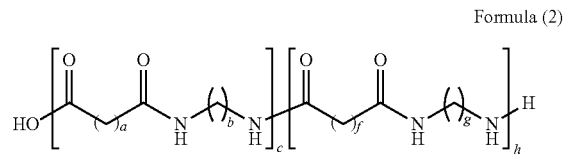

Formula (2)

wherein: a=2-16; b=2-16; c=75-99 wt %; f=2-16; g=2-16; and h=1-25 wt %, and wherein a and f cannot be identical, or b and g cannot be identical; and wherein one or more of the methylene groups of each of (a), (b), (f) and (g) may be substituted, such as with alkyl and/or aromatic substituents; and

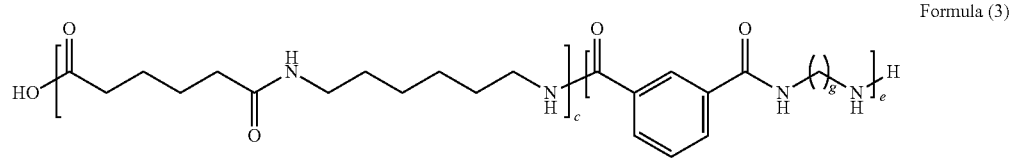

Formula (3)

wherein: c=70-99 wt %; g=2-16; and e=1-30 wt %, and wherein for Formula (1), the range of "2-16" for each of variables "a", "b" and "d" independently includes all ranges in between, such as, for example, but not limited to, 2-14, 2-12, 2-10, 2-8, 2-6, 2-4, 3-16, 3-14, 3-12, 3-10, 3-8, 3-6, 3-4, 4-16, 4-14, 4-12, 4-10, 4-8, 4-6, 5-16, 5-14, 5-12, 5-10, 5-8, 6-16, 6-14, 6-12, 6-10, 6-8, 7-16, 7-14, 7-12, 7-10, 7-8, 8-16, 8-14, 8-12, 8-10, 9-16, 9-14, 9-12, 9-10, 10-16, 10-14, 10-12, 12-16, 12-14 and 14-16; the range of "75-99 wt %" for variable "c" includes all ranges in between, such as, for example, but not limited to, 75-97 wt %, 75-95 wt %, 75-93 wt %, 75-90 wt %, 75-87 wt %, 75-85 wt %, 75-83 wt %, 75-80 wt %, 78-97 wt %, 78-95 wt %, 78-93 wt %, 78-90 wt %, 78-87 wt %, 78-85 wt %, 78-83 wt %, 82-99 wt %, 82-97 wt %, 82-95 wt %, 82-93 wt %, 82-91 wt %, 82-89 wt %, 82-87 wt %, 82-85 wt %, 85-99 wt %, 85-95 wt %, 85-90 wt %, 87-99 wt %, 87-96 wt %, 87-93 wt %, 87-90 wt %, 90-99 wt %, 90-95 wt % and 95-99 wt %; and the range of "1-25 wt %" for variable "e" includes all ranges in between, such as, for example, but not limited to, 1-20 wt %, 1-17 wt %, 1-15 wt %, 1-13 wt %, 1-10 wt %, 1-8 wt %, 1-5 wt %, 2-22 wt %, 2-20 wt %, 2-18 wt %, 2-16 wt %, 2-14 wt %, 2-12 wt %, 2-10 wt %, 2-8 wt %, 2-6 wt %, 2-4 wt %, 4-23 wt %, 4-20 wt %, 4-18 wt %, 4-16 wt %, 4-14 wt %, 4-12 wt %, 4-10 wt %, 4-8 wt %, 4-6 wt %, 6-25 wt %, 6-23 wt %, 6-20 wt %, 6-18 wt %, 6-16 wt %, 6-14 wt %, 6-12 wt %, 6-10 wt %, 6-8 wt %, 8-25 wt %, 8-23 wt %, 8-20 wt %, 8-18 wt %, 8-16 wt %, 8-14 wt %, 8-12 wt %, 8-10 wt %, 10-25 wt %, 10-23 wt %, 10-20 wt %, 10-18 wt %, 10-16 wt %, 10-14 wt %, 10-12 wt %, 12-25 wt %, 12-23 wt %, 12-20 wt %, 12-18 wt %, 12-16 wt %, 12-14 wt %, 14-25 wt %, 14-23 wt %, 14-20 wt %, 14-18 wt %, 14-16 wt %, 16-25 wt %, 16-23 wt %, 16-20 wt % and 16-18 wt %; and wherein for Formula (2), the range of "2-16" for each of variables "a", "b", "f" and "g" independently includes all ranges in between, such as, for example, but not limited to, 2-14, 2-12, 2-10, 2-8, 2-6, 2-4, 3-16, 3-14, 3-12, 3-10, 3-8, 3-6, 3-4, 4-16, 4-14, 4-12, 4-10, 4-8, 4-6, 5-16, 5-14, 5-12, 5-10, 5-8, 6-16, 6-14, 6-12, 6-10, 6-8, 7-16, 7-14, 7-12, 7-10, 7-8, 8-16, 8-14, 8-12, 8-10, 9-16, 9-14, 9-12, 9-10, 10-16, 10-14, 10-12, 12-16, 12-14 and 14-16; the range of "75-99 wt %" for variable "c" includes all ranges in between, such as, for example, but not limited to, 75-97 wt %, 75-95 wt %, 75-93 wt %, 75-90 wt %, 75-87 wt %, 75-85 wt %, 75-83 wt %, 75-80 wt %, 78-97 wt %, 78-95 wt %, 78-93 wt %, 78-90 wt %, 78-87 wt %, 78-85 wt %, 78-83 wt %, 82-99 wt %, 82-97 wt %, 82-95 wt %, 82-93 wt %, 82-91 wt %, 82-89 wt %, 82-87 wt %, 82-85 wt %, 85-99 wt %, 85-95 wt %, 85-90 wt %, 87-99 wt %, 87-96 wt %, 87-93 wt %, 87-90 wt %, 90-99 wt %, 90-95 wt % and 95-99 wt %; and the range of "1-25 wt %" for variable "h" includes all ranges in between, such as, for example, but not limited to, 1-20 wt %, 1-17 wt %, 1-15 wt %, 1-13 wt %, 1-10 wt %, 1-8 wt %, 1-5 wt %, 2-22 wt %, 2-20 wt %, 2-18 wt %, 2-16 wt %, 2-14 wt %, 2-12 wt %, 2-10 wt %, 2-8 wt %, 2-6 wt %, 2-4 wt %, 4-23 wt %, 4-20 wt %, 4-18 wt %, 4-16 wt %, 4-14 wt %, 4-12 wt %, 4-10 wt %, 4-8 wt %, 4-6 wt %, 6-25 wt %, 6-23 wt %, 6-20 wt %, 6-18 wt %, 6-16 wt %, 6-14 wt %, 6-12 wt %, 6-10 wt %, 6-8 wt %, 8-25 wt %, 8-23 wt %, 8-20 wt %, 8-18 wt %, 8-16 wt %, 8-14 wt %, 8-12 wt %, 8-10 wt %, 10-25 wt %, 10-23 wt %, 10-20 wt %, 10-18 wt %, 10-16 wt %, 10-14 wt %, 10-12 wt %, 12-25 wt %, 12-23 wt %, 12-20 wt %, 12-18 wt %, 12-16 wt %, 12-14 wt %, 14-25 wt %, 14-23 wt %, 14-20 wt %, 14-18 wt %, 14-16 wt %, 16-25 wt %, 16-23 wt %, 16-20 wt % and 16-18 wt %; and wherein for Formula (3), the range of "2-16" for variable "g" includes all ranges in between, such as, for example, but not limited to, 2-14, 2-12, 2-10, 2-8, 2-6, 2-4, 3-16, 3-14, 3-12, 3-10, 3-8, 3-6, 3-4, 4-16, 4-14, 4-12, 4-10, 4-8, 4-6, 5-16, 5-14, 5-12, 5-10, 5-8, 6-16, 6-14, 6-12, 6-10, 6-8, 7-16, 7-14, 7-12, 7-10, 7-8, 8-16, 8-14, 8-12, 8-10, 9-16, 9-14, 9-12, 9-10, 10-16, 10-14, 10-12, 12-16, 12-14 and 14-16; the range of "70-99 wt %" for variable "c" includes all ranges in between, such as, for example, but not limited to, 72-99 wt %, 72-97 wt %, 72-95 wt %, 72-93 wt %, 72-91 wt %, 72-89 wt %, 72-87 wt %, 72-85 wt %, 75-99 wt %, 75-95 wt %, 75-90 wt %, 77-99 wt %, 79-96 wt %, 79-93 wt %, 77-90 wt %, 70-99 wt %, 70-95 wt % and 95-99 wt %; and the range of "1-30 wt %" for variable "e" includes all ranges in between, such as, for example, but not limited to, 1-27 wt %, 1-25 wt %, 1-20 wt %, 1-18 wt %, 1-16 wt %, 1-14 wt %, 1-12 wt %, 1-10 wt %, 1-8 wt %, 1-6 wt %, 1-4 wt %, 2-27 wt %, 2-25 wt %, 2-20 wt %, 2-18 wt %, 2-16 wt %, 2-14 wt %, 2-12 wt %, 2-10 wt %, 2-8 wt %, 2-6 wt %, 2-4 wt %, 4-27 wt %, 4-25 wt %, 4-20 wt %, 4-18 wt %, 4-16 wt %, 4-14 wt %, 4-12 wt %, 4-10 wt %, 4-8 wt %, 4-6 wt %, 6-27 wt %, 6-25 wt %, 6-20 wt %, 6-18 wt %, 6-16 wt %, 6-14 wt %, 6-12 wt %, 6-10 wt %, 6-8 wt %, 8-27 wt %, 8-25 wt %, 8-20 wt %, 8-18 wt %, 8-16 wt %, 8-14 wt %, 8-12 wt %, 8-10 wt %, 10-27 wt %, 10-25 wt %, 10-20 wt %, 10-18 wt %, 10-16 wt %, 10-14 wt %, 10-12 wt %, 12-27 wt %, 12-25 wt %, 12-20 wt %, 12-18 wt %, 12-16 wt %, 12-14 wt %, 14-27 wt %, 14-25 wt %, 14-20 wt %, 14-18 wt %, 14-16 wt %, 16-27 wt %, 16-25 wt %, 16-20 wt % and 16-18 wt %.

In an exemplary embodiment, the copolyamide composition of Formula (1) has Formula (4)

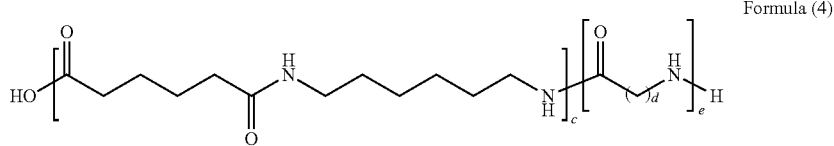

Formula (4)

wherein: c=75-99 wt %; d=4-12; and e=1-25 wt %; and wherein for Formula (4), the range of "4-12" for variable "d" includes all ranges in between, such as, for example, but not limited to, 4-10, 4-9, 4-8, 4-7, 4-6, 4-5, 5-12, 5-11, 5-10, 5-9, 5-8, 5-7, 6-12, 6-11, 6-10, 6-9, 6-8, 7-12, 7-11, 7-10, 7-9, 7-8, 8-12, 8-11, 8-10, 8-9, 9-12, 9-11, 9-10 and 10-12; the range of "75-99 wt %" for variable "c" includes all ranges in between, such as, for example, but not limited to, 75-97 wt %, 75-95 wt %, 75-93 wt %, 75-90 wt %, 75-87 wt %, 75-85 wt %, 75-80 wt %, 78-99 wt %, 78-97 wt %, 78-95 wt %, 78-93 wt %, 78-90 wt %, 78-87 wt %, 78-85 wt %, 78-80 wt %, 82-99 wt %, 82-97 wt %, 82-95 wt %, 82-93 wt %, 82-91 wt %, 82-89 wt %, 82-87 wt %, 82-85 wt %, 85-99 wt %, 85-95 wt %, 85-90 wt %, 87-99 wt %, 87-96 wt %, 87-93 wt %, 87-90 wt %, 90-99 wt %, 90-95 wt % and 95-99 wt %; and the range of "1-25 wt %" for variable "e" includes all ranges in between, such as, for example, but not limited to, 1-23 wt %, 1-20 w %, 1-18 wt %, 1-16 wt %, 1-14 wt %, 1-12 wt %, 1-10 wt %, 1-8 wt %, 1-6 wt %, 1-4 wt %, 2-20 wt %, 2-18 wt %, 2-16 wt %, 2-14 wt %, 2-12 wt %, 2-10 wt %, 2-8 wt %, 2-6 wt %, 2-4 wt %, 4-20 wt %, 4-18 wt %, 4-16 wt %, 4-14 wt %, 4-12 wt %, 4-10 wt %, 4-8 wt %, 4-6 wt %, 6-20 wt %, 6-18 wt %, 6-16 wt %, 6-14 wt %, 6-12 wt %, 6-10 wt %, 6-8 wt %, 8-20 wt %, 8-18 wt %, 8-16 wt %, 8-14 wt %, 8-12 wt %, 8-10 wt %, 10-20 wt %, 10-18 wt %, 10-16 wt %, 10-14 wt %, 10-12 wt %, 12-20 wt %, 12-18 wt %, 12-16 wt %, 12-14 wt %, 14-20 wt %, 14-18 wt %, 14-16 wt %, 16-20 wt % and 16-18 wt %.

In an exemplary embodiment, the copolyamide composition of Formula (2) is of Formula (5)

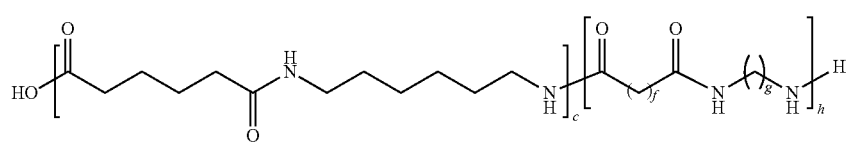

Formula (5)

wherein: c=75-99 wt %; f=2-16; g=2-16; and h=1-25 wt %, and wherein f cannot be 4 or g cannot be 6; and wherein for Formula (5), the range of "2-16" for each of variables "f" and "g" independently includes all ranges in between, such as, for example, but not limited to, 2-14, 2-12, 2-10, 2-8, 2-6, 2-4, 3-16, 3-14, 3-12, 3-10, 3-8, 3-6, 3-4, 4-16, 4-14, 4-12, 4-10, 4-8, 4-6, 5-16, 5-14, 5-12, 5-10, 5-8, 6-16, 6-14, 6-12, 6-10, 6-8, 7-16, 7-14, 7-12, 7-10, 7-8, 8-16, 8-14, 8-12, 8-10, 9-16, 9-14, 9-12, 9-10, 10-16, 10-14, 10-12, 12-16, 12-14 and 14-16; the range of "75-99 wt %" for variable "c" includes all ranges in between, such as, for example, but not limited to, 75-97 wt %, 75-95 wt %, 75-93 wt %, 75-90 wt %, 75-87 wt %, 75-85 wt %, 75-80 wt %, 78-99 wt %, 78-97 wt %, 78-95 wt %, 78-93 wt %, 78-90 wt %, 78-87 wt %, 78-85 wt %, 78-80 wt %, 82-99 wt %, 82-97 wt %, 82-95 wt %, 82-93 wt %, 82-91 wt %, 82-89 wt %, 82-87 wt %, 82-85 wt %, 85-99 wt %, 85-95 wt %, 85-90 wt %, 87-99 wt %, 87-96 wt %, 87-93 wt %, 87-90 wt %, 90-99 wt %, 90-95 wt % and 95-99 wt %; and the range of "1-25 wt %" for variable "h" includes all ranges in between, such as, for example, but not limited to, 1-23 wt %, 1-20 w %, 1-18 wt %, 1-16 wt %, 1-14 wt %, 1-12 wt %, 1-10 wt %, 1-8 wt %, 1-6 wt %, 1-4 wt %, 2-20 wt %, 2-18 wt %, 2-16 wt %, 2-14 wt %, 2-12 wt %, 2-10 wt %, 2-8 wt %, 2-6 wt %, 2-4 wt %, 4-20 wt %, 4-18 wt %, 4-16 wt %, 4-14 wt %, 4-12 wt %, 4-10 wt %, 4-8 wt %, 4-6 wt %, 6-20 wt %, 6-18 wt %, 6-16 wt %, 6-14 wt %, 6-12 wt %, 6-10 wt %, 6-8 wt %, 8-20 wt %, 8-18 wt %, 8-16 wt %, 8-14 wt %, 8-12 wt %, 8-10 wt %, 10-20 wt %, 10-18 wt %, 10-16 wt %, 10-14 wt %, 10-12 wt %, 12-20 wt %, 12-18 wt %, 12-16 wt %, 12-14 wt %, 14-20 wt %, 14-18 wt %, 14-16 wt %, 16-20 wt % and 16-18 wt %.

In an exemplary embodiment, the copolyamide composition is PA66-s-6 or PA66-s-6,9.

In an exemplary embodiment, the copolyamide composition further comprises a final copper concentration of greater than 60 ppm and less than 500 ppm, such as greater than 80 and less than 300 ppm, such as greater than 80 and less than 200 ppm. In a particular embodiment, the copper is in the form of copper iodide:potassium iodide in a ratio between 1:4 and 1:10, such as 1:5, such as 1:6, such as 1:7, such as 1:8.

The copolyamide composition may comprise a lubricant. In an exemplary embodiment, the copolyamide composition further comprises a lubricant selected from the group consisting of aluminum distearate, zinc stearate and calcium stearate at a concentration between 250 and 5,000 ppm, such as between 250 and 3,000 ppm, such as between 250 and 2,000 ppm, such as between 500 and 1,000 ppm, such as between 500 and 800 ppm.

The copolyamide composition may comprise an anti-block agent. In an exemplary embodiment, the copolyamide composition further comprises an anti-block agent selected from the group consisting of N,N'-ethylene bis-steramide and stearyl erucamide at a concentration between 200 and 5,000 ppm, such as between 200 and 3,000 ppm, such as between 250 and 2,000 ppm, such as between 1,000 and 2,000 ppm, such as between 1,000 and 1,500 ppm.

In an exemplary embodiment, the copolyamide composition further comprises diatomaceous earth (such as, for example, talc, calcium carbonate or silicon dioxide) as an anti-block agent at a concentration between 10 and 1,000 ppm, such as between 10 and 500 ppm, such as between 20 and 800 ppm, such as between 50 and 500 ppm, such as between 100 and 300 ppm.

In an exemplary embodiment, the copolyamide composition is of Formula (1) or Formula (4) where c is 90 and e is 10, and wherein the copolyamide composition has a relative viscosity of 90-230, such as 100-200, such as 100-150, such as 90-150.

In an exemplary embodiment, the copolyamide composition is of Formula (2) or Formula (5) where c is 90 and h is 10, and wherein the copolyamide composition has a relative viscosity of 90-230, such as 100-200, such as 100-150, such as 90-150.

In an exemplary embodiment, the copolyamide composition is of Formula (3) where c is 90 and e is 10, and wherein the copolyamide composition has a relative viscosity of 90-230, such as 100-200, such as 100-150, such as 90-150.

In an exemplary embodiment, the copolyamide composition comprises a final copper concentration of greater than 60 ppm and less than 500 ppm and a lubricant selected from the group consisting of aluminum distearate, zinc stearate and calcium stearate at a concentration between 250 and 5,000 ppm, such as between 250 and 3,000 ppm, such as between 250 and 2,000 ppm.

In an exemplary embodiment, the copolyamide composition has a crystallization rate of at least 10× slower, such as 20× slower, such as 30× slower, such as 40× slower, such as 50× slower than a PA66 homopolymer at less than or equal to 200° C. and an overall isothermal crystallization behavior substantially similar to Nylon6.

In an exemplary embodiment, the copolyamide composition has a semi-crystallization rate less than Nylon6 while possessing a melting point of at least 15° C. greater than Nylon6, such as at least 16° C. greater than Nylon6, such as at least 17° C. greater than Nylon6, such as at least 18° C. greater than Nylon6, such as at least 19° C. greater than Nylon6, but in an exemplary embodiment of less than or up to 20° C. greater than Nylon6.

In an exemplary embodiment, PA66-s-6 exhibits a decrease in caprolactam exudation in film processing in comparison to Nylon6 and blends of Nylon6,6 and Nylon6.

An aspect of the present invention is a copolyamide composition comprising from 80-99 wt % of a polyamide (such as PA66 or PA69) and from 1-25 wt % of a lactam (such as caprolactam); or 1-30 wt % of AA-BB comonomer unit (such as 6,I or 6,9), where the copolyamide composition has a melting temperature equal to or greater than 220° C.

In an exemplary embodiment, the copolyamide composition has a relative viscosity according to ASTM D789 (9.34) of 60 to 350, such as 80 to 300, such as 85 to 250, such as 90 to 230, such as 95 to 230, such as 100 to 230, such as 100 to 200.

In an exemplary embodiment, the Nylon6,6 is prepared from an aqueous salt of adipic acid and hexamethylene diamine.

In an exemplary embodiment, the copolyamide composition comprises 80-99 wt % units from hexamethylene diamine and adipic acid and 1-20 wt % of units from a lactam or AA-BB comonomer and has a relative viscosity according to ASTM D789 (9.34) of 80 to 300, such as 85 to 250, such as 90 to 230, such as 95 to 230, such as 100 to 230, such as 100 to 200.

In an exemplary embodiment, the lactam repeating unit is selected from the group consisting of an aliphatic cyclic lactams such as, but not limited to, butyrolactam, valerolactam, ε-caprolactam, enantiolactam, capryllactam laurolactam, 12-aminodoecanolactam, 2-azacyclononone and 1-aza-2-cyclooctanone.

In a particular embodiment, the lactam repeating unit is ε-caprolactam or laurolactam.

In an exemplary embodiment, the AA-BB repeating unit is selected from the product prepared from a dicarboxylic acid and a diamine and includes, but is not limited to, PA6,9; PA6,10; PA6,12; PA 6,18; PA 9,6; and PA 10,6.

In an exemplary embodiment, the dicarboxylic acid (diacid) is an aliphatic dicarboxylic acid selected from the group consisting of 2,2-dimethyl-glutaric acid (HOOC—C(CH$_3$)$_2$—COOH); 2,4,4-trimethyl-adipic acid (HOOC—CH(CH$_3$)—CH$_2$—C(CH$_3$)$_2$—COOH); pimelic acid (HOOC—(CH$_2$)$_5$—COOH); suberic acid (HOOC—(CH$_2$)$_6$—COOH); azelaic acid (HOOC—(CH$_2$)$_7$—COOH); sebacic acid (HOOC—(CH$_2$)$_8$—COOH); undecanedioic acid (HOOC—(CH$_2$)$_9$—COOH); dodecanedioic acid (HOOC—(CH$_2$)$_{10}$—COOH); brassylic acid (HOOC—(CH$_2$)$_{11}$—COOH); tetradecanedioic acid (HOOC—(CH$_2$)$_{12}$—COOH); hexadecanedioic acid (HOOC—(CH$_2$)$_{14}$—COOH); octadecanedioic acid (HOOC—(CH$_2$)$_{16}$—COOH), 1-3-cyclohexane dicarboxylic acid and includes anhydrides of any of the aforementioned dicarboxylic acids.

In an exemplary embodiment, adipic acid, azelaic acid, sebacic acid, undecanedioic acid, and tetradecanedioic acid are preferred dicarboxylic acids.

In an exemplary embodiment, the dicarboxylic acid or anhydride is an aromatic dicarboxylic acid or anhydride selected from the group consisting of isophthalic acid; orthophthalic acid; phthalic anhydride; and non-linear naphthalene dicarboxylic acids (such as, for example, 2,7-naphthalene dicarboxylic acid; 2,3-naphthalene dicarboxylic acid; 1,4-naphthalene dicarboxylic acid; and 1,8-naphthalene dicarboxylic acid).

In an exemplary embodiment, isophthalic acid is a preferred aromatic dicarboxylic acid.

In an exemplary embodiment, the diamine is selected from the group consisting of 2-methyl-1,5-diaminopentane; 2,4,4-trimethyl-1,6-hexamethylenediamine; 1-8-diaminooctane; 2-methyl-1,8-diaminooctane; 1,9-nonanediamine; 5-methyl-1,9-nonanediamine; 1,10-diaminodecane; 1,11-diaminoundecane; 1,12-diaminododecane; 1,13-diaminotridecane; 1,14-diaminotetradecane; 1,16-diaminohexadecane; and 1,18-diaminooctadecane.

In an exemplary embodiment, 2-methyl-1,5-diaminopentane; 1,9-nonanediamine; and 1,11-diaminoundecane are preferred diamines.

In an exemplary embodiment, the copolyamide composition comprises 90 wt % of PA66 units and 10 wt % of PA6 units in a PA66-s-6 statistical copolymer, where the 6,6 and 6 units are statistically reacted together and distributed in the backbone of the linear aliphatic copolyamide, having a relative viscosity of 60 to 365, such as 100 to 200 and a maximum crystallization temperature of 185° C. In a particular embodiment, the copolyamide composition further comprises a final copper concentration of greater than 60 ppm in the form of copper iodide:potassium iodide in a 1:8 weight ratio, a lubricant selected from the group consisting of aluminum distearate, zinc stearate and calcium stearate at a concentration between 250 and 5,000 ppm and a melting point of approximately 245° C.

In an exemplary embodiment, the copolyamide composition comprises a final copper concentration of greater than 60 ppm and less than 500 ppm and a lubricant selected from the group consisting of aluminum distearate, zinc stearate and calcium stearate at a concentration between 250 and 5,000 ppm.

In an exemplary embodiment, the copolyamide composition has a crystallization rate of at least 10× slower than a PA66 homopolymer at less than or equal to 200° C. and an overall isothermal crystallization behavior substantially similar to Nylon6.

In an exemplary embodiment, the copolyamide composition has a crystallization rate of at least 20× slower than a PA66 homopolymer at less than or equal to 200° C.

In an exemplary embodiment, the copolyamide composition has a semi-crystallization rate less than Nylon 6 while possessing a melting point of at least 15° C. greater than Nylon 6.

In an exemplary embodiment, the copolyamide composition exhibits a decrease in caprolactam exudation in film processing in comparison to Nylon6 and blends of Nylon6,6 and Nylon6.

In an exemplary embodiment, the copolyamide composition exhibits biaxial orientation allowing for at least 25% greater stretching ability (3.4×3.4 vs 4.3×4.3), a higher melting point, and up to 40% greater puncture resistance than Nylon6.

In an exemplary embodiment, the copolyamide composition exhibits the following properties in multilayer blown film: 1. high frost line (double that of PA6 and the same as PA6-s-66$_{85}$ but with 25° C. higher melting point), (2) high gloss (more than double PA6), and (3) high puncture resistance (more than double PA6) in a seven layer film structure comprising 35% of polyamide in 2-layers with the other layers being based on polyethylene-based materials (i.e., linear low density polyethylene (LLDPE), low density polyethylene (LDPE), and maleated ethylene-hexene copolymer tie resins).

An aspect of the invention is a cast film or a blown film comprising one or more of the described copolyamide compositions. In an exemplary embodiment, one or both of the cast and blown films is biaxially oriented. In an exemplary embodiment, the blown film is a double- or triple-bubble film.

In an exemplary embodiment, the cast film or the blown film comprises, is obtained from and/or is prepared from a copolyamide selected from the group consisting of PA66-s-6; PA66-s-6,9; PA66-s-6,10; PA66-s-6,12; PA66-s-9,6; PA66-s-10,6; PA69-s-6; PA69-s-6,10; and PA69-s-6,12.

In an exemplary embodiment, the cast film has an ultimate tensile strength of greater than 100 MPa, such as greater than 150 MPa, such as greater than 200 MPa, such as greater than 250 MPa, such as greater than 300 MPa, but typically less than or equal to about 325 MPa.

In an exemplary embodiment, the cast film has an elongation to break of greater than 350%, such as greater than 400%, such as greater than 450%, but typically less than about 500%.

In an exemplary embodiment, the cast film has a tear strength according to ASTM D1922 of greater than 50 grams, such as greater than 60 grams, such as greater than 70 grams, such as greater than 80 grams, such as greater than 100 grams, but less than or equal to about 150 grams in the machined direction (MD) and greater than 100 grams, such as greater than 150 grams, such as greater than 200 grams, such as greater than 250 grams, but less than or equal to about 300 grams in the transverse direction (TD).

In an exemplary embodiment, the cast film has an ultimate tensile strength of greater than 100 MPa and less than 140 MPa, such as greater than 110 MPa and less than 140 MPa, such as greater than 120 MPa and less than 140 MPa, an elongation to break of greater than 350% and less than 600%, such as greater than 400% and less than 600%, such as greater than 450% and less than 600%, a tear strength according to ASTM D1922 of greater than 50 grams and less than 150 grams, such as greater than 75 grams and less than 150 grams, such as greater than 80 grams and less than 150 grams, such as greater than 90 grams and less than 150 grams, a Dart drop puncture resistance according to ASTM D1709 of greater than 2,000 grams, such as greater than 2,500 grams, but less than about 3,000 grams, where the thickness of the tested specimens was 1.5 mil or 38 microns, and an oxygen transmission rate of no greater than 1.5 $cm^3/100$ $in^2$-day-atm, such as no greater than 1.0 $cm^3/100$ $in^2$-day-atm, such as no greater than 0.5 $cm^3/100$ $in^2$-day-atm.

In an exemplary embodiment, the cast film has an ultimate tensile strength of greater than 100 MPa and less than 140 MPa, an elongation to break of greater than 350% and less than 600%, a tear strength according to ASTM D1922 of greater than 50 grams and less than 150 grams, a Dart drop puncture resistance according to ASTM D1709 of greater than 2,000 grams, and an oxygen transmission rate of no greater than 1.5 $cm^3/100$ $in^2$-day-atm.

In an aspect of the invention, the copolyamide compositions of the present invention exhibit a biaxial orientation sufficient to achieve a greater stretching ability (i.e., a greater extensibility in a machine and transverse direction), a higher melting point (i.e., a higher end use temperature), and/or up to a greater puncture resistance than Nylon6. In an exemplary embodiment, the stretching ability is greater by at least 25%, the melting point is higher by up to at least 30° C. and/or the puncture resistance is greater by up to at least 40%.

In an exemplary embodiment, the copolyamide composition comprises 85 wt % of PA66 units and 15 wt % of PA6 units in a PA66-s-6 statistical copolymer having a relative viscosity of 60 to 365, a melting point of approximately 235° C. and a maximum crystallization temperature of 170° C.

In an exemplary embodiment, the copolyamide composition comprises 90 wt % of PA66 units and 10 wt % of PA6 units in a PA66-s-6 statistical copolymer having a relative viscosity of 60 to 365, a melting point of approximately 245° C. and a maximum crystallization temperature of 185° C.

In an exemplary embodiment, the copolyamide composition comprises 85 wt % of PA66 units and 15 wt % of PA69 units in a PA66-s-6,9 statistical copolymer having a relative viscosity of 60 to 365.

In an exemplary embodiment, the copolyamide composition comprises 90 wt % of PA66 units and 10 wt % of PA69 units in a PA66-s-6,9 statistical copolymer having a relative viscosity of 60 to 365.

BRIEF DESCRIPTION OF THE DRAWINGS

The following figures are merely representative of particular embodiments of the present invention and are not intended to otherwise limit the scope of the invention as described herein.

Nylon6-s-66 (15 wt % 6); and Nylon66-s-6 (23 wt % 6) blown films yield equivalent clarity to Nylon6 while offering a large improvement versus Nylon6,6/Nylon6 blends, which are typically used in applications requiring higher heat performance. High clarity can be attributed to (1) slower crystallinity, (2) smaller spherulite size (specifically, versus Nylon6,6 and Nylon 6,6/Nylon6 blends), and (3) film homogeneity (Nylon6,6/Nylon6 blends). A substantial reduction in the haze appearing in the Nylon6,6 film sample is noticeable in the Nylon6,6-s-$6_{10}$; Nylon6-s-66 (15 wt % 6); and Nylon66-s-6 (23 wt % 6) blown films.

Figure 8A:
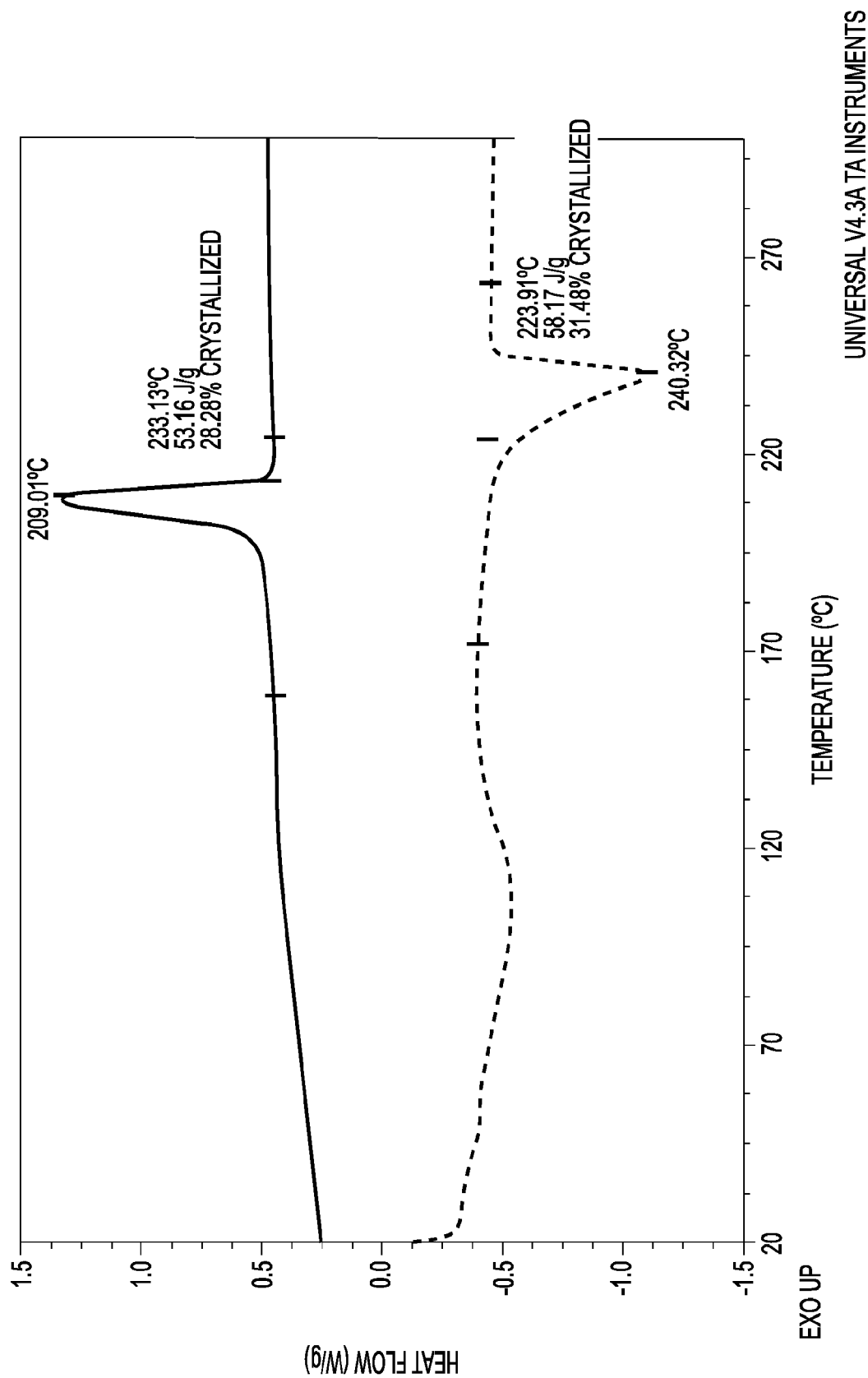
Figure 8B:
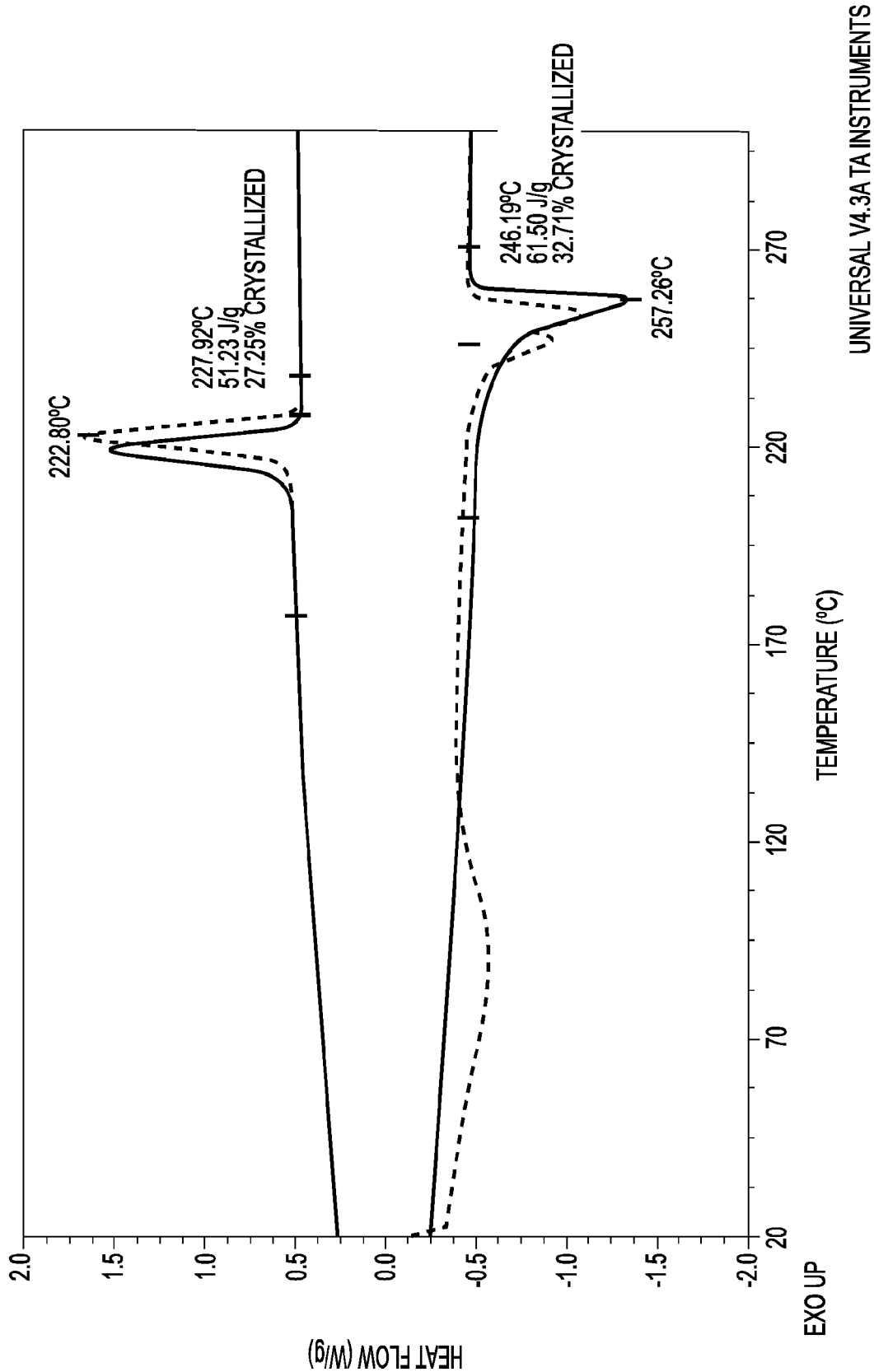
Figure 8C:
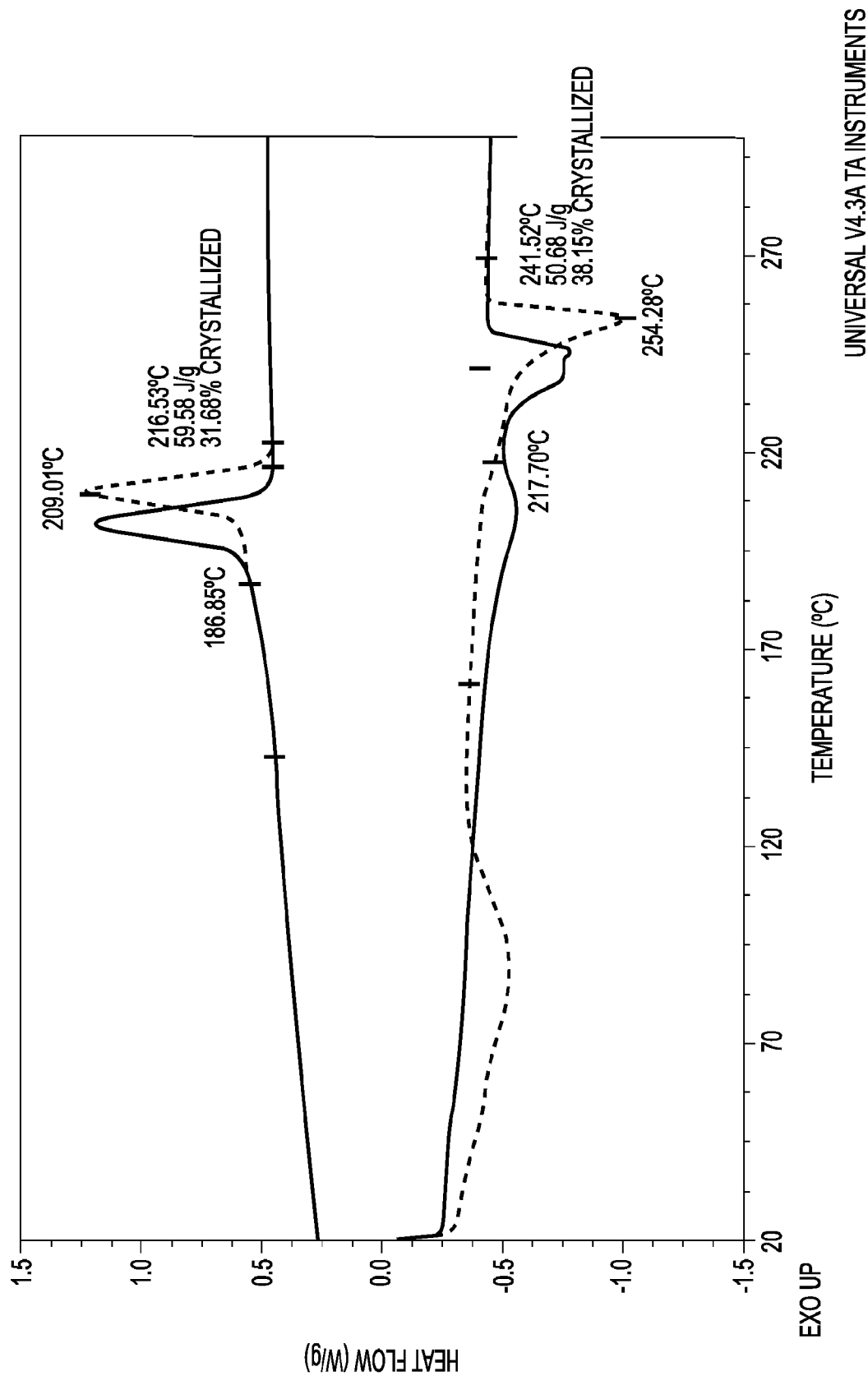

FIGS. 8A, 8B and 8C show differential scanning calorimetry data on blown film samples of Nylon6,6-s-$6_{10}$ (8A), 75/25 blends of Nylon6,6 and Nylon6 (8B), and 50/50 blends of Nylon6,6 and Nylon6 (8C). The Nylon6,6-s-$6_{10}$ copolymer offers a single melting point which can be tailored with the amount of caprolactam incorporation, whereby pellet blends result in films with dual melting behavior which compromises film clarity and thermal performance.

Figure 9:
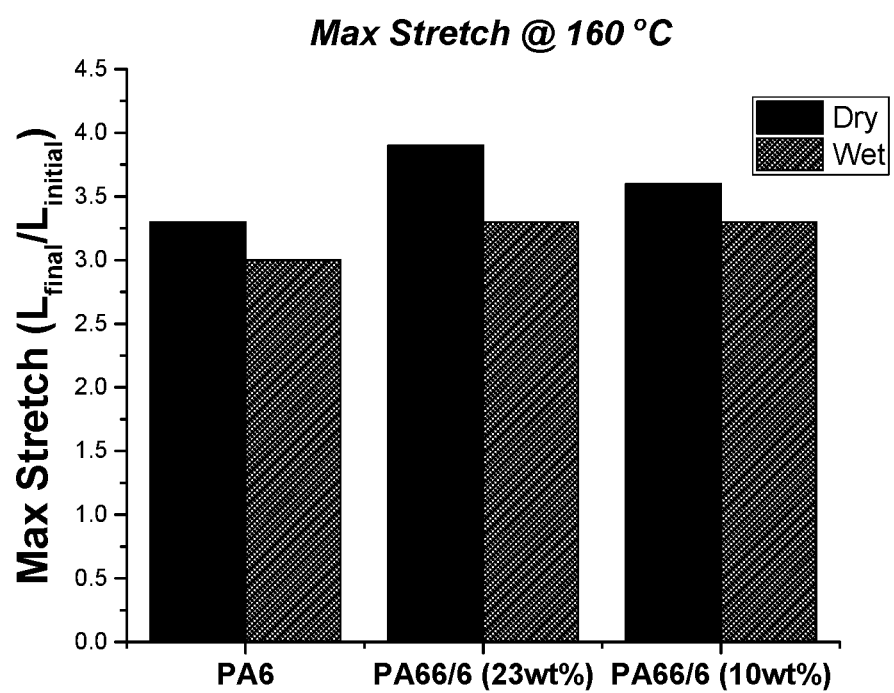

FIG. 9 shows dry and wet max stretching results at 160° C. for PA6, PA 66/6 (23 wt % 6) and PA66/6 (10 wt % 6), where both copolymers exhibit advantages versus PA6. The 23 wt % copolymer demonstrates a 19% improvement in the dry state which shows potential value for stretching in a multilayer film with polypropylene (i.e., polypropylene (PP) orients at lower temperatures and under dry conditions).

Figure 10:
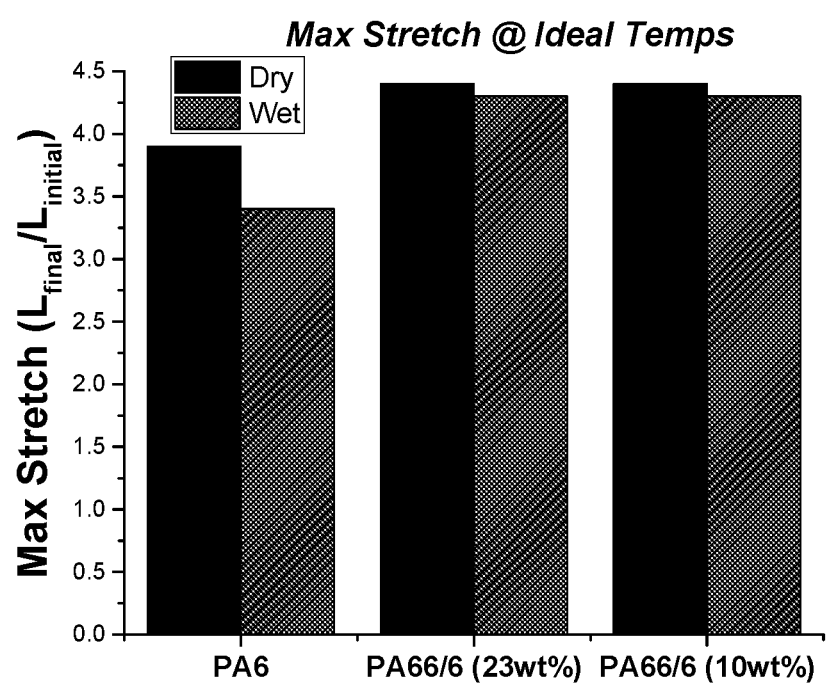

FIG. 10 shows dry and wet stretching results at 200° C. for PA6, PA 66/6 (23 wt % 6) and PA66/6 (10 wt % 6) in a simultaneous fashion. The PA 66/6 copolymers demonstrate up to 25% greater stretching ability than PA6 under the prescribed, hydrated stretching conditions.

Figure 11:
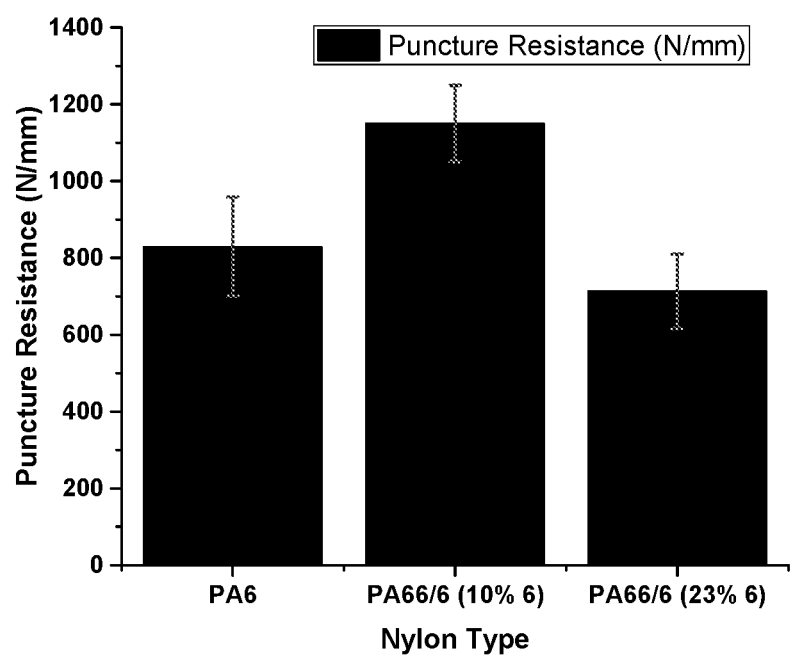

FIG. 11 shows puncture resistance results for PA 66/6 (23 wt % 6) and PA66/6 (10 wt % 6) compared to nylon tape (PA6) at a stretching temperature of 200° C.

Figure 12:
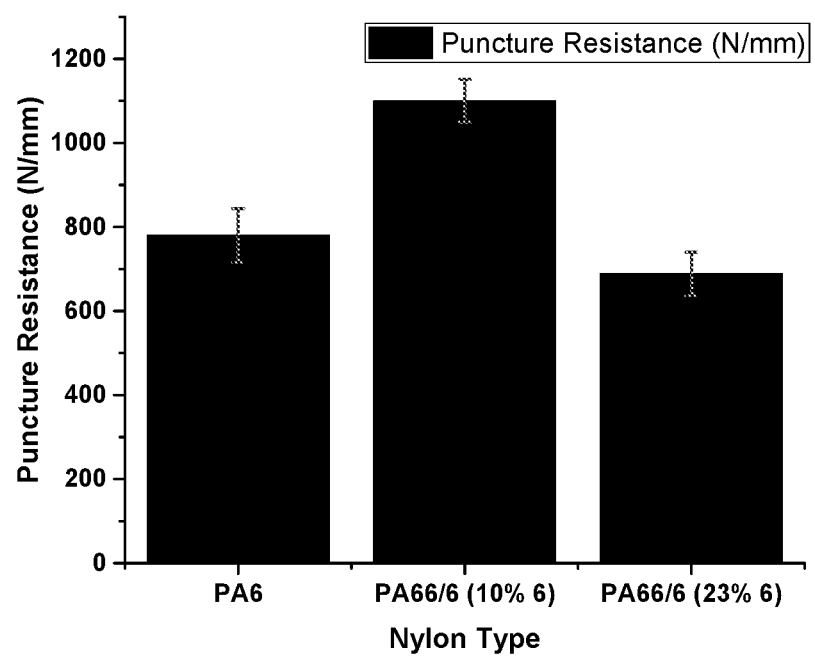

FIG. 12 shows puncture resistance results for PA 66/6 (23 wt % 6) and PA66/6 (10 wt % 6) compared to nylon tape (PA6) at a stretching temperature of 160° C.

Figure 13:
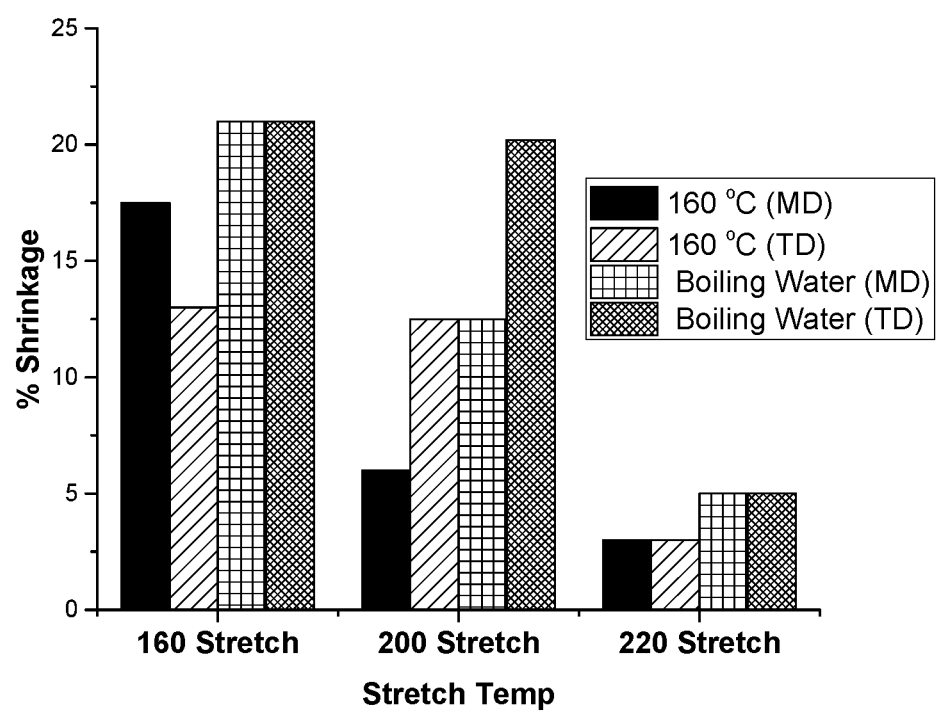

FIG. 13 shows shrinkage versus annealing temperatures of 160° C., 200° C. and 220° C.

Figure 14:
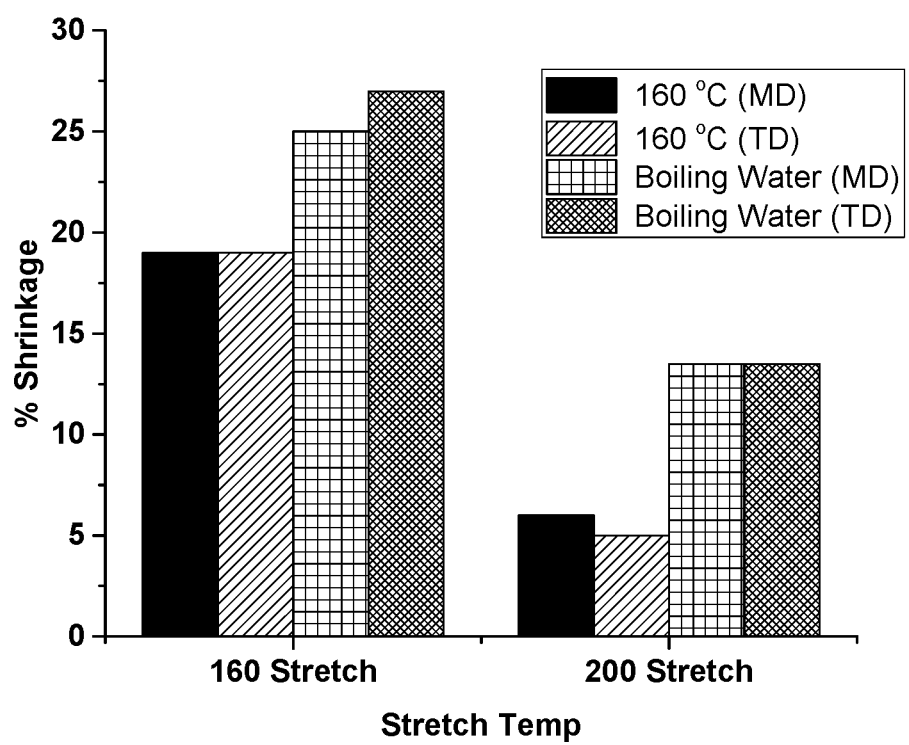

FIG. 14 shows shrinkage versus annealing temperatures of 160° C. and 200° C.

Figure 15:
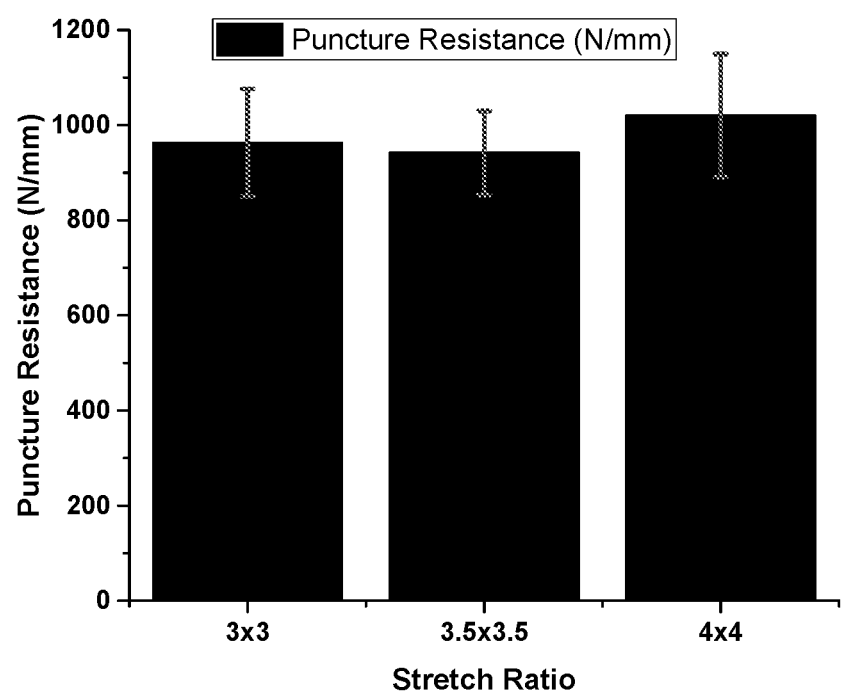

FIG. 15 shows puncture resistance vs stretch ratio for PA66-s-$6_{10}$.

Figure 16:
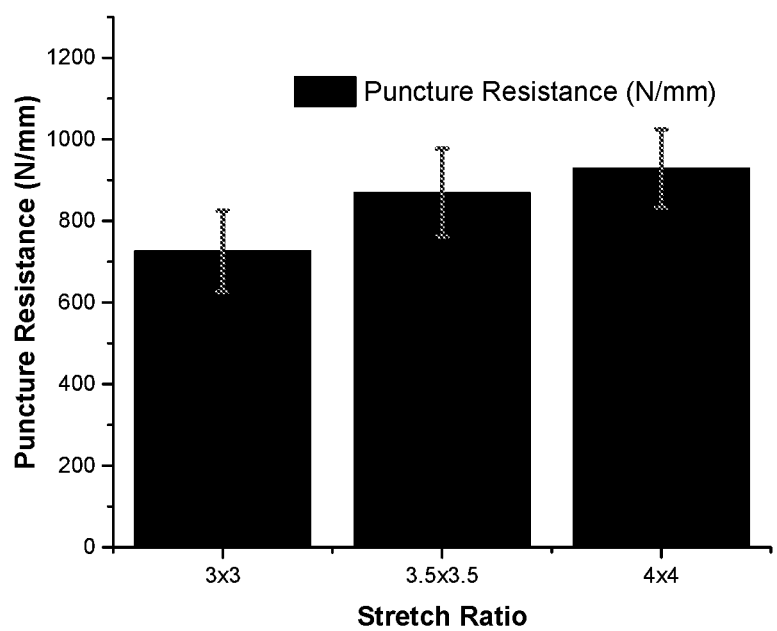

FIG. 16 shows puncture resistance vs stretch ratio for PA66-s-$6_{23}$. A significant improvement in puncture resistance of 27% is observed in going from a 3×3 to a 4×4 stretch.

Figure 17:
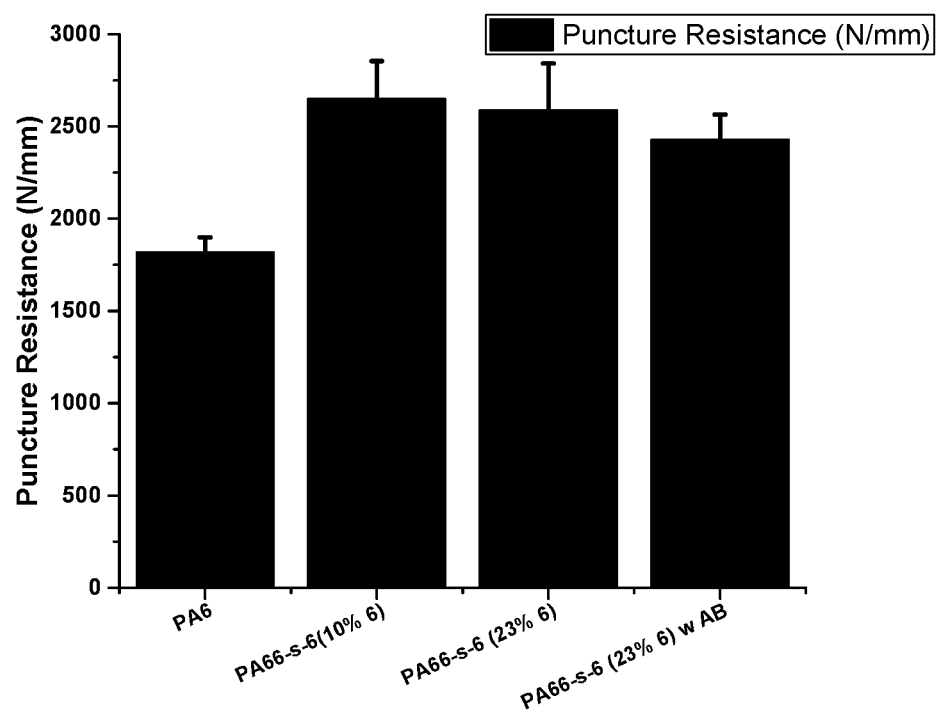

FIG. 17 shows puncture resistance for sequentially oriented samples of PA6 (3×3 MD×TD stretch, commercial film from American Biaxis, Inc.), PA6,$6_{90}$-s-$6_{10}$ (3.2×4.3 MD×TD stretch, 15% relaxation, 400° F. annealing) and PA6,$6_{77}$-s-$6_{23}$ (2.9×4 MD×TD stretch, 10% relaxation, 395° F. annealing). PA6,6 copolymers offered up to 45% higher puncture resistance than commercial oriented Nylon (PA6-based) which is consistent with the data generated for simultaneously stretched film.

Figure 18:
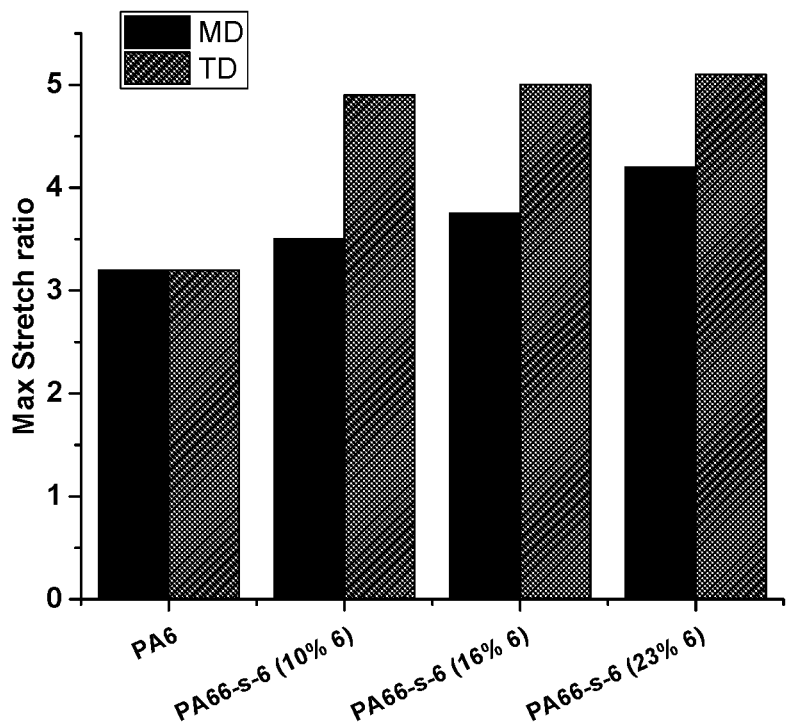

FIG. 18 shows maximum sequential stretch ratios in the machine direction and transverse direction. This data is in close agreement with data generated from a simultaneously oriented process. Higher stretch ratios can increase yield and enhance the max throughput that a Nylon film line can generate, assuming the thickness is constant.

Figure 19:
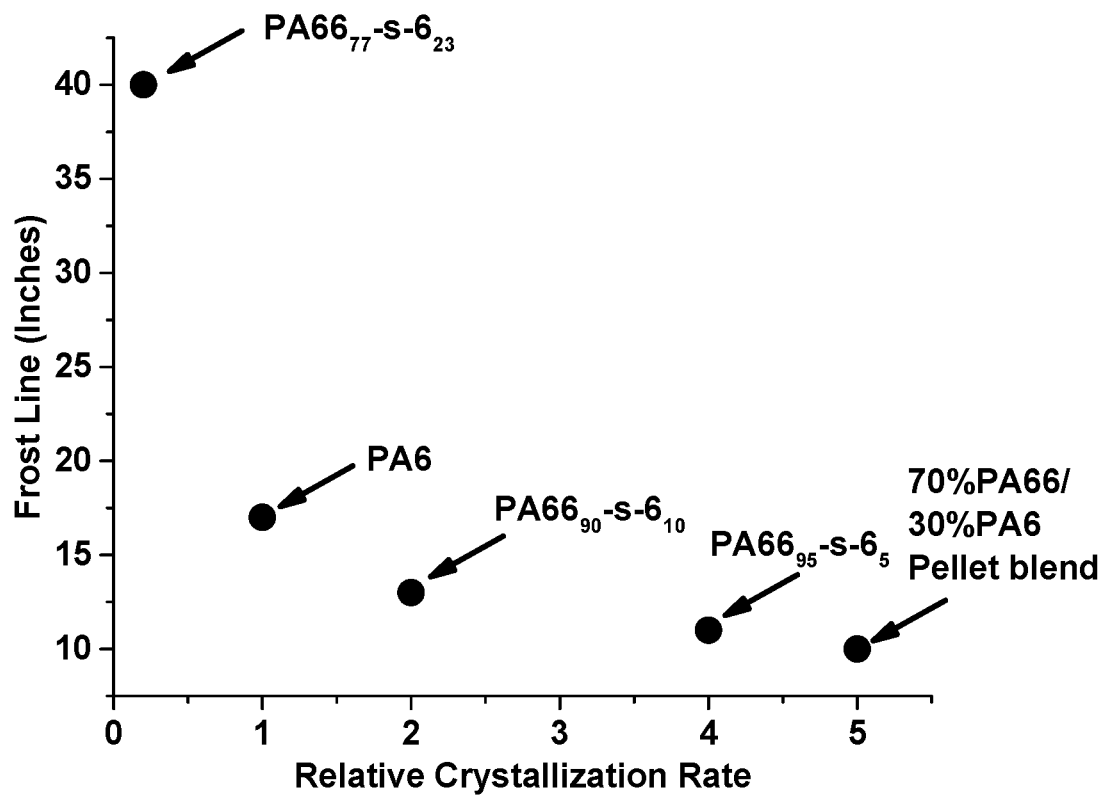

FIG. 19 illustrates the relationship between crystallization rates on the frost line, or where the material set up on a blown film line can be visualized. As can be seen, slower crystallization rates than PA6 provide significant advantages on the frost line, which allow for a more stable process and the potential for increased blow up ratios.

Figure 20:
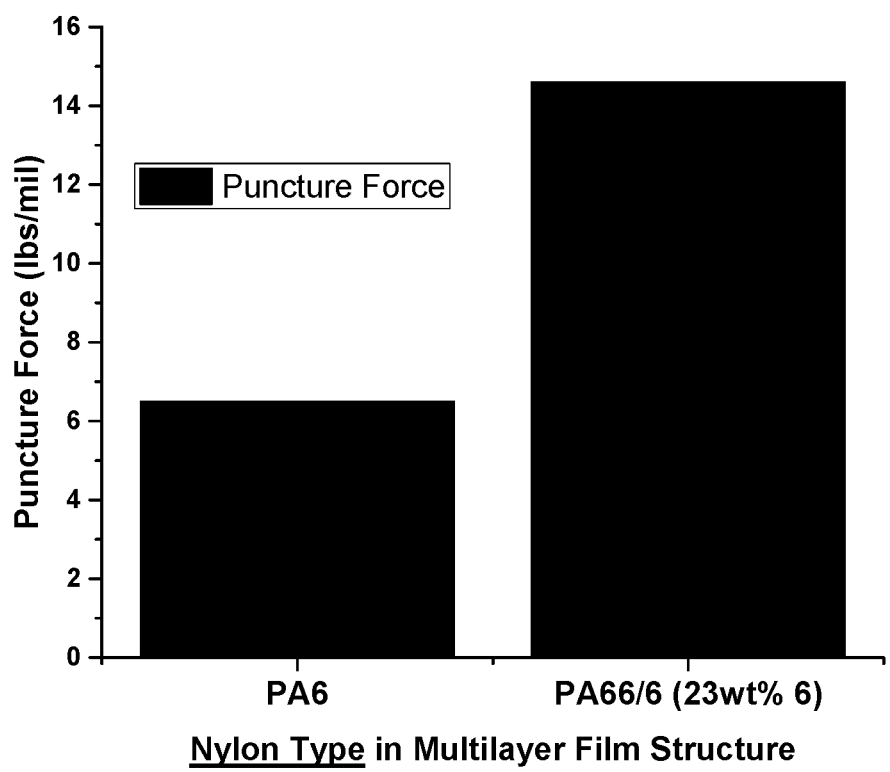

FIG. 20 illustrates puncture resistance for PA6 and PA66-s-6 (23 wt % 6) in a PA/Tie/LDPE/Tie/PA/Tie/PE structure. When using the PA66-s-6 copolymer, the multilayer film exhibits a 2.2× increase in the puncture force versus using PA6.

Figure 21:
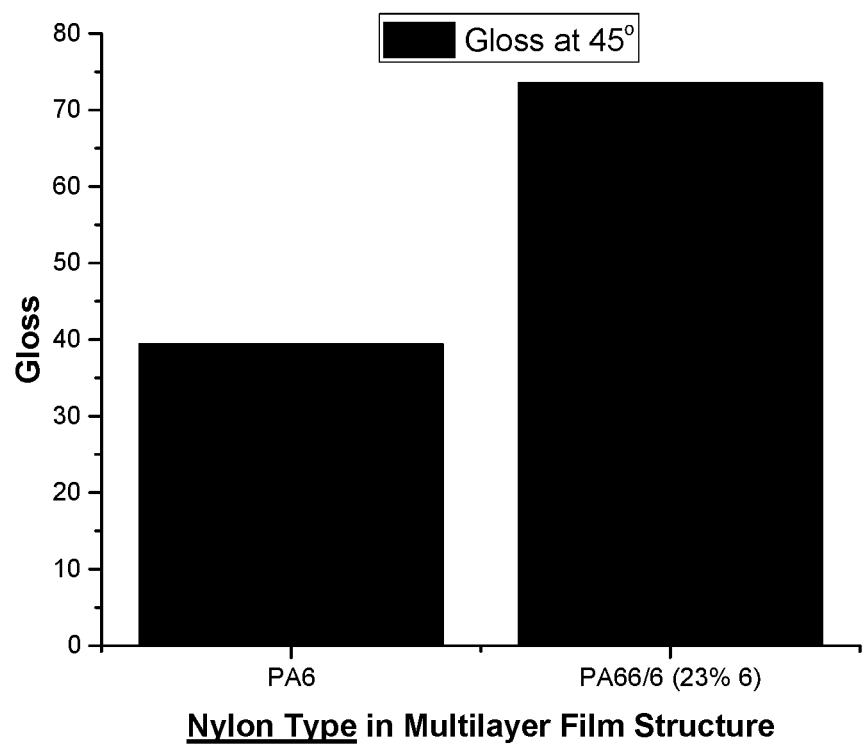

FIG. 21 illustrates gloss values for PA6 and PA66-s-6 (23 wt % 6) in a PA/Tie/LDPE/Tie/PA/Tie/PE structure. The PA66-s-6 copolymer exhibits a 1.9× increase in gloss, which provides a significant value for package aesthetics, while maintaining temperature performance (important for heat sealing on food packaging lines).

Figure 22:
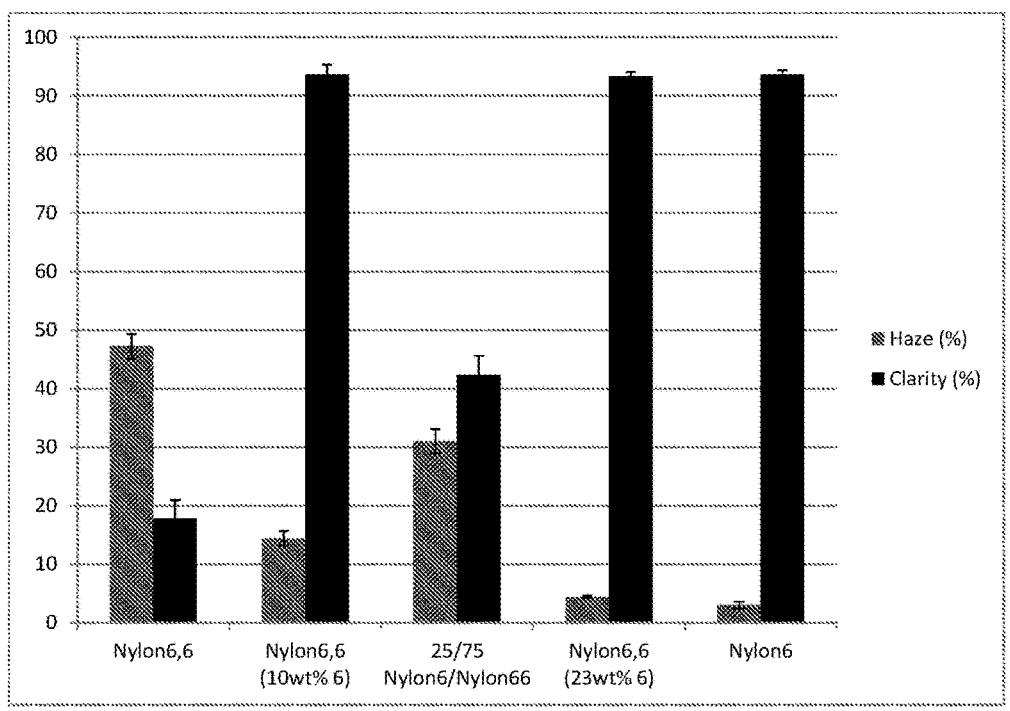

FIG. 22 illustrates a significant clarity boost/haze reduction in going from Nylon6,6 or Nylon6,6 and Nylon6 pellet blends to Nylon6,6/6 copolymers.

DETAILED DESCRIPTION OF THE INVENTION

Process for Synthesizing Disclosed Copolyamides

In an exemplary embodiment, the copolyamide of the present invention comprises repeating 1:1 adipic acid-hexamethylene diamine units (PA66) combined with repeating units from lactams such as caprolactam (PA6) or from AA-BB units such as PA69. In other exemplary embodiments, the polyamide of the present invention comprises repeating units of other linear aliphatic dicarboxylic acids/diamines such as azelaic acid-hexamethylene diamine (PA69) combined with repeating units from lactams such as caprolactam (PA6) or from AA-BB units such as PA6,10.

A phosphorous-containing catalyst is added prior to the initial polymerization step. Suitable phosphorous catalysts include, but are not limited to, phosphorous acid; phosphonic acid; alkyl- and aryl-substituted phosphonic acids; hypophosphorous acid; alkyl-, aryl- and alkyl-/aryl-substituted phosphinic acids; and phosphoric acid. Esters and salts of these phosphorous-containing acids are also acceptable for addition and include, but are not limited to, alkyl, aryl and alkyl/aryl esters, metal salts, ammonium salts, and ammonium alkyl salts.

The polymerization of the copolyamide of the invention may be carried out according to conventional continuous or batchwise operating conditions known for the polymerization of polyamides such as Nylon6,6. (M. Kohan, Nylon Plastics Handbook, 1995; G. Odian, Principles of Polymerization, $4^{th}$ Edition, 2004).

Such a polymerization process may comprise: (a) heating the blend with stirring; (b) holding the blend under a suitable pressure and temperature for a given period of time, with removal of water vapor via a suitable device; followed by (c) decompression and holding for a given period of time at a temperature above the melting point of the blend, either under nitrogen or under vacuum, in order to thus continue polymerization by removal of the water by-product that is formed.

At the end of the polymerization process, the polymer is cooled, typically with water, and extruded, typically in the form of rods. These rods are subsequently cut up in order to produce pellets.

The pellets are then subjected to solid state polymerization (SSP) under an inert atmosphere and elevated temperatures. Suitable temperatures for SSP include temperatures above the glass transition temperature of the polymer and temperatures below the melting temperature of the polymer. Suitable temperature ranges for solid state polymerization are between about 160 and 220° C., such as between about 180 and 200° C. After the polymerization is complete, various additives may be added to the polyamide pellets depending on the anticipated use. The pellets may also be blended with additives or polyamide pellets containing additives prior to packaging and transport.

Lubricants

The disclosed copolyamide compositions may also contain processing aides in the form of common lubricants. Non-limiting examples of lubricants include stearates (e.g., aluminum distearate, zinc stearate and calcium stearate), N,N' ethylene bis-stearamide, and stearyl erucamide. Aluminum distearate and N,N' Ethylene Bisstearamide are examples of preferred lubricants.

Anti-Block Agents

The present copolyamide invention may also include anti-block agents for the production into film to prevent the film to film sticking when wound tightly onto a roll. Typically, the agents are added to lower surface energy or to create nano-level bumps that reduce the coefficient of friction of the film surface. Inorganic solids, usually in the form of diatomaceous earth, represent one class of materials that can be added to the disclosed copolyamide composition. Non-limiting examples include calcium carbonate, silicon dioxide, magnesium silicate, sodium silicate, aluminum silicate and aluminum potassium silicate. Many low surface energy organic materials can also be used. Non-limiting examples include N,N'-ethylene bis-stearamide, stearyl erucamide, glycerol monostearate, zinc stearate, aluminum distearate, and calcium stearate. N,N'-ethylene bis-stearamide and silicon dioxide are examples of preferred anti-block agents.

Nucleating Agents

The disclosed copolyamide compositions may also contain a nucleating agent to further improve clarity and oxygen barrier as well as enhance oxygen barrier. Typically, these agents are insoluble, high melting point species that provide a surface for crystallite initiation. By incorporating a nucleating agent, more crystals are initiated, which are smaller in nature. More crystallites or higher % crystallinity correlates to more reinforcement/higher tensile strength and a more tortuous path for oxygen flux (increased barrier); smaller crystallites decreases light scattering which correlates to improved clarity. Non-limiting examples include calcium fluoride, calcium carbonate, talc and Nylon 2,2.

Anti-Oxidants and Heat Stabilizers

The compositions according to the invention can further include organic anti-oxidants in the form of hindered phenols such as, but not limited to, Irganox 1010, Irganox 1076 and Irganox 1098; organic phosphites such as, but not limited to, Irgafos 168 and Ultranox 626; aromatic amines, metal salts from Groups IB, IIB, III, and IV of the periodic table and metal halides of alkali and alkaline earth metals. Copper iodide (CuI) and potassium iodide (KI) are preferred heat stabilizers, and in an exemplary embodiment are present in a ratio of 1/8.

The copolyamides of the present invention, such as the Nylon6,6-rich copolyamides, exhibit useful properties for a broad range of film applications. Nylon is well known for its use in films due to its high strength, puncture resistance, aroma barrier, and good oxygen barrier properties. In meat and cheese packaging, nylon is used as a component in a multilayer film to deliver the aforementioned properties. In multi-layer films, nylon is also a key material for thermoforming, given its high melting point and strength maintenance (especially key where the package becomes thin upon drawing the film into a three dimensional shape). In the conventional art, PA 6,6-based materials are not utilized in thermoforming applications due to their rapid crystallization. Thus, the utility of the reduced crystallization rate of Nylon6,6-based copolyamides is novel and advantageous. The high melting point of Nylon 6,6-based polyamides allow use in boil-in-bag applications (i.e., poultry, ribs, etc.). Further, for sausage casings, the high melting point of Nylon 6,6-based copolyamides allows for film dimensional stability in situations in which the sausage may be cooked in the bag. In addition, the low barrier to moisture is important for preventing the sausage from drying.

Industrial film applications chiefly include films that are employed for structural components that can be subjected to high temperatures. For example, composite materials are often cured in a nylon bag inside an autoclave. Additionally, in sterilization applications, the higher melting point offered by Nylon 6,6-based materials inhibits film sagging (i.e., maintains dimension stability at elevated temperatures). In an exemplary embodiment, the nylon component is key for its high melting temperature/dimensional stability at elevated temperatures. The copolyamides of the invention, such as the Nylon6,6-based materials, bring value to this application given the increased film softness which allows for intimate contact with the substrate and which eliminates oxygen bubbles and creates a smooth surface to the cured part. Biaxially-oriented polyamide (BOPA) is also a very useful material, given its high tensile strength and added oxygen barrier. These materials are often used in retort or stand up pouches and lidding ("The Opportunity for Polyamide in Film." PCI Films Consulting Limited, 2015). Nylon 6,6 does not possess the ability to be bi-axially oriented due to its rapid crystallization rate which inhibits stretching upon initial film formation. Thus, the disclosed Nylon 6,6-based copolyamides are highly suitable for entrance into the BOPA market.

Examples

Exemplary films prepared from: $PA66_{90}$-s-$6_{10}$; 25 wt % Nylon6 and 75 wt % Nylon6,6 pellet blends; and 50 wt % Nylon6 and 50 wt % Nylon6,6 pellet blends. The copolyamide compositions of the invention can be prepared and analyzed in view of the following examples.

Example 1. Preparation of $PA66_{90}$-s-$6_m$ 1,656 g of a PA66 salt comprising of equimolar amounts of a hexamethylene diamine (HMD) and a dicarboxylic acid (adipic acid for Nylon6,6) at a 56% concentration in water was poured into a 2,000 ml glass beaker with a stir bar on top of a heating plate set to 60° C. to maintain solution temperature in order to prevent salt from crashing out of solution. 80 g of solid caprolactam (10 wt % caprolactam in the final polymer—the amount of caprolactam can be adjusted as needed, such as between 1 and 25 wt %) was added to the heated salt solution. The solution was allowed to stir until all solids were dissolved. An anti-foam agent, a catalyst and/or additional HMD were added as needed and allowed to stir until completely dissolved. The solution was dumped into an autoclave (volume 2 L) equipped with a heating jacket. Polymerization was carried out in 5 cycles, where the $1^{st}$ cycle was an evaporation cycle, where the solution was heated above the boiling temperature of water concentrating the salt solution. In the $2^{nd}$ cycle, the pressure was increased to 265 psig and temperature was increased to 243° C. In the $3^{rd}$ cycle, the pressure was reduced slowly over a 40 minute time span. The polymerization was allowed to continue for 35 minutes in the $4^{th}$ cycle at a temperature above the melting point. In the 5$^{th}$ cycle, molten nylon was extruded as a strand from the bottom of the reactor, quenched in a water bath and then pelletized using a pelletizer with a rotating chopper blade. The nylon pellet sample (about 800 grams) was then subjected to a solid state polymerization (SSP) procedure. SSP was carried out on pellets in a glass jar inside of an oven. The jar was fitted with a nitrogen wand and a thermocouple that extended from the lid down into the pellets and there was a shorter tube that allowed for the nitrogen to then exit. The SSP reaction was conducted at 180° C. for 3 hours with a nitrogen flow of 30% of 3.62 SCFM.

Determination of Melting and Crystallization Temperatures.

Melting and crystallization behavior were determined via differential scanning calorimetry using a heating and cooling rate of 20° C. per minute against an empty reference pan. 5-10 mg of sample were heated at 20° C. per minute to 300° C. followed by cooling to 0° C. Melting temperatures were determined from the middle of the endothermic peak during heating (i.e., the peak appeared between 200 and 270° C. and was dependent on the copolymer composition) and crystallization temperatures were determined from the middle of the exothermic peak during cooling (i.e., the peak appeared between 140 and 230° C. and was dependent on the copolymer composition).

Determination of Semi-Crystallization Times.

Semi-crystallization time versus temperature was performed by isothermal differential scanning calorimetry, where the initial heat history of the polyamide (PA66 and PA6) and copolyamide (PA66-s-6) pellets were erased by heating to above the melting point followed by rapid cooling (greater than 200° C./min) to a specific temperature (such as, but not limited to a range of 100-240° C.). Semi-crystallization time was recorded as the time required to achieve a peak crystallization exothermic transition at each specific temperature. It was observed that the crystallization rate increased as semi-crystallization time decreased. This technique proved to be effective to provide a systematic comparison of crystallization time or rate versus temperature for various thermoplastics. As described herein, it was specifically used to compare the semi-crystallization time of polyamides and copolyamides.

Isothermal crystallization studies were performed using a differential scanning calorimeter of the power compensation design with separate low-mass furnaces for sample and reference, such as a Perkin-Elmer model Pyris One DSC equipped with a mechanical refrigeration device capable of −90 C operation. Samples were either 3 to 5 mg in weight, encapsulated in TA Instruments crimped aluminum pans weighing about 20 mg; or, 1 to 2 mg in weight, encapsulated in Perkin-Elmer HyperDSC™ aluminum pans weighing approximately 8 mg. Specimens were cut from pellets using a razor blade to provide thin, flat pieces. The purge gas was dry nitrogen. The test program consisted of heating the specimen from 25 to 305° C., holding for five minutes at 305° C., cooling at 200° C./minute to the target isothermal temperature, and holding there until the recrystallization exotherm was completed.

Quantitative Determination of Monomer Exudation at Processing.

Monomer exudation under processing conditions was correlated by generating monomer formation versus time plots using a high temperature sublimation technique through gas chromatography (GC) or liquid chromatography mass spectroscopy (LC MS). Samples of polyamides and copolyamides were heated at a constant temperature analogous to typical processing temperatures and monomer evolution and accumulation were measured versus time to determine a weight/time of monomer formation.

End Groups.

The copolyamide compositions of the present invention typically exhibit a delta end group (i.e., carboxylic acid ends-amine ends or amine ends-carboxylic acid ends) value of 1-50 micro equivalents/gram, such as 5-30 micro equivalents/gram, such as 5-15 micro equivalents/gram). Amine end groups were observed to range from 5-79 micro-equivalents/gram, such as from 10-45 microequivalents/gram, such as from 15-35 micro equivalents/gram).

Example 2. Film Preparation

Films of polyamides, copolyamides, and pellet blends of polyamides (PA66 and PA6) were prepared by melting through a single screw extruder at temperatures between 250° C. and 300° C. Cast films were prepared by extruding through a slip die and rolling onto a chilled roll through winding. Film thickness was adjusted by adjusting winding speeds and adjusting the die gap. Blown films were prepared by extruding through a circular die and blowing up through an air ring and winding into a final roll. Film thickness was controlled by adjusting the die gap and controlling the air velocity.

Multilayer blown film was prepared by using a single (mono) layer and 7-layer lines to characterize films with polyamide resins of the invention with varying structures. In an exemplary embodiment, the components of a coextruded blown film line included: a resin feed system; extruders; a coextrusion die; an air ring; an internal pressure control for adjusting bubble diameter; a collapsing frame; a take up or haul off roll which sets the machine direction draw; a treatment system; and a winder.

The design features that are important in producing quality film at a competitive price include: an efficient and properly sized resin handling and feed system; an efficient screw design that provides a quality melt with: uniform, efficient temperature control, stable pressure; and at a high rate; an optimized die that provides good layer control and thickness uniformity, where the die is designed for ease of maintenance and durability; air rings that provide excellent cooling control and uniformity; an automated web handling system for improved efficiency and reduced change over times; modular design features for product changeovers; and integrated control systems that are intuitive, operator friendly, and that keep the process parameters on target. Detailed multi-blown film processes are described in, for example, H. F. Giles Jr. et al., *Extrusion: The Definitive Processing Guide and Handbook*, William Andrew Inc., Norwich, N.Y., (2005); and J. R. Wagner, Jr., *Multilayer Flexible Packaging*, Elsevier, (2010).

To determine critical characteristics of the film produced, several important process parameters were collected and studies and observations made. One key parameter is blow up ratio and draw ratio. The draw ratio in the Machine Direction (MD) is characterized by the draw down ratio (DDR), which is defined as the haul off speed divided by the polymer melt velocity as it exits the die. The blow-up ratio (BUR) characterizes the draw ratio in the Transverse Direction (TD) or hoop dimension. BUR is defined as the final bubble diameter divided by the die diameter. In addition, frost line height and process time are important parameters too. Process time, in the blown film process, is defined as the time it takes the polymer to begin to freeze once it exited the die. It is proportional to the frost line height and inversely related to haul-off speed. A key to stabilizing the bubble when preparing film with varying structures is Internal Bubble stability or control and that is controlled separately within the control systems utilized.

For 7-layer (i.e., 7 different polymer layers) film studies, which included two to three polyamide layers, multiple structures were studied, ranging from symmetrical (i.e., the left and right sides from center are balanced) to asymmetrical (i.e., imbalanced left and right sides from center). Selected examples of different structures are shown in Table 1 below, illustrating the process parameters monitored.

TABLE 1

| TYPE | A (Inner) LDPE | B Tie Layer | C Polyamide | D EVOH | E Polyamide | F Tie Layer | G (Outer) Polyamide |
|---|---|---|---|---|---|---|---|
| DENSITY | 0.919 | 0.920 | 1.130 | 1.200 | 1.130 | 0.920 | 1.130 |
| M.I. | 0.3 | 1.0 | 1.0 | 1.0 | 1.0 | 1.0 | 1.0 |
| Layer % | 15.0 | 15.0 | 15.0 | 10.0 | 15.0 | 15.0 | 15.0 |
| Estimated Rate, lb/hr | 39.7 | 39.7 | 48.8 | 34.5 | 48.8 | 39.7 | 48.8 |
| Estimated Mass % | 13.2% | 13.2% | 16.3% | 11.5% | 16.3% | 13.2% | 16.3% |
| Pump Rate, lb/hr/rpm | 1.30 | 0.54 | 0.67 | 0.68 | 0.71 | 0.57 | 1.1 |
| Estimated Screw, rpm | 30.5 | 73.6 | 72.8 | 50.8 | 68.7 | 69.7 | 44.3 |
| Zone 1 Barrel Temp, F. | 350 | 350 | 440 | 325 | 440 | 350 | 440 |
| Zone 2 Barrel Temp, F. | 430 | 430 | 520 | 420 | 520 | 430 | 520 |
| Zone 3 Barrel Temp, F. | 410 | 410 | 520 | 410 | 520 | 410 | 520 |
| Zone 4, Barrel Temp, F. | 410 | 410 | 500 | 410 | 500 | 420 | 520 |
| Zone 5, Barrel Temp, F. | 410 | | | | | | 520 |
| Screen Changer | 420 | 400 | 500 | 420 | 500 | 420 | 535 |
| Adaptor | 420 | 400 | 500 | 430 | 500 | 420 | 535 |
| Die Zone Temp, F. | 430 | 430 | 480 | 430 | 480 | 430 | 480 |
| Top Die, F. | 510 | | | | | | |
| Inner Mandrel, F. | 510 | | | | | | |
| Air Ring Supply, F. | 45 | | | | | | |
| IBC Air Supply, F. | 45 | | | | | | |

LDPE = low-density polyethylene;
EVOH = ethylene vinyl alcohol

Internal bubble stability was found to be sensitive to control in structures where the induced internal air speed was minimized to maintain the stability of the bubble. Frost line is defined as the height at which the bubble transforms from completely transparent to slightly hazy (due to polymer crystallization). An example of a multilayer structure is viewed in table 1 above.

Multiple structures of film were observed in order to understand and characterize film properties such as clarity, barrier and curl, among other key properties, which allowed the determination of a crystallinity threshold of co-polyamide resins to be incorporated into structures without any bubble instability or manufacturing issues. It was determined that 10% comonomer in the form of lactams or other AA-BB monomers (i.e., 6,I) was required to efficiently process PA66-s-X copolymers (where X can be PA6, PA6,9, PA6,I, etc.). Efficient processing was based on a stable bubble, allowing for an uninterrupted, continuous production of multilayer, blown film. PA66-based copolymers with less than 10 wt % comonomer were more challenging in stabilizing the bubble, which is fundamentally related to a higher % difference in the temperature and rate at which the different components in the multilayer structure transition from molten to solid.

Relative Viscosity Determination.

Relative viscosities were performed according to ASTM D789 (9.34) at a concentration of 10 wt % in formic acid (Brookfield Rheometry). The relative viscosity is a measure of the increase in viscosity from the polymer relative to the solvent. The dissolved solution was placed in a temperature bath at 25° C. for at least one hour before measurement. Before weighing, polymer samples were dried for 20 minutes at 93° C.+/−4° C. to remove traces of moisture and were cooled in a desiccator. An automated device dosed in the correct weight of formic acid based on the dried sample weight. Glass capillary viscometers and an automated testing device were used. The rheometer determines viscosity by measuring the force required to turn a spindle in the solution at a specific rate.

Film Testing.

Mechanical properties were evaluated via tensile testing to provide tensile strength, modulus, and % elongation to break, Elmendorf tear resistance, and dart drop to depict puncture resistance properties. Film clarity was quantified according to ASTM D1003 using a Byk Gardner, Haze-Guard Plus instrument. Oxygen transmission rates were determined via ASTM D3985 using a coulometric detector. Below is a list of the conventional testing techniques and ASTM methods used.

| Test Type | Test Method Used |
|---|---|
| Oxygen Transmission Rate (OTR) | ASTM D3985 |
| Elmendorf Tear | ASTM D1922 |
| Dart Drop (f50) | ASTM D1709, A |
| Tensile/Elongation | ASTM D882 |
| 1% Secant Modulus | ASTM D882 |
| % Clarity | ASTM D1003 |

Biaxially Oriented Films.

The data provided below in Tables 1 to 3 reflects biaxially oriented film that was stretched in a simultaneous process on a Karo IV lab stretcher. The initial un-oriented cast film thickness was 150 microns and was stretched down to 7.5 to 20 microns, based on the final stretch temperature. The polyamides were stretched at temperatures ranging from 160 to 220° C. using a stretch speed of 200%/sec, a pre-heating of 5 seconds, and annealing/relaxation time of 3 seconds.

The relaxation was set to 3%. Films were tested for mechanical properties (i.e., tensile strength, elongation to break, modulus of elasticity, and puncture resistance), and thermal shrinkage (i.e., hot air at 160° C. and boiling water, both for 5 minutes). While biaxially oriented Nylon (BON) is traditionally produced from Nylon6, the results below show a significant advantage exhibited by the PA66/6 (10 wt % 6) copolymer which provided 25% greater stretch ability, up to 40% higher puncture resistance, and a melting point of +25° C. versus Nylon6. Shrinkage is a key property for biaxially oriented film. The objective is to minimize shrinkage, as when it is laminated with other components (i.e., polypropylene film, biaxially oriented PET, aluminum), after which it is then subjected to a heating step for sterilization, such as hot water or hot air. To maintain the integrity and shape of the package, it is important to minimize shrinkage of each polymeric layer.

Table 2 displays property comparisons between polyamide films that were biaxially oriented at 200° C. during a simultaneous stretching process (i.e., stretched in machine direction and transverse direction at the same time).

TABLE 2

| Property @ 23° C., 50% RH 15 micron, biaxially oriented film, stretched at 3 × 3 @ 200° C. | Test Method | PA6 | PA66/6 (10 wt % PA6) ($T_m$ = 245° C.) | PA66/6 (23 wt % PA6) ($T_m$ = 220° C.) |
|---|---|---|---|---|
| Tensile Strength MD (MPa) | ASTM D882 | 252 | 307 | 262 |
| Tensile Strength TD (MPa) | ASTM D882 | 262 | 356 | 285 |
| % Elongation @ Break (MD) | ASTM D882 | 93 | 115 | 112 |
| % Elongation @ Break (TD) | ASTM D882 | 95 | 106 | 102 |
| Young's Modulus MD (MPa) | ASTM D882 | 3533 | 2984 | 2453 |
| Young's Modulus TD (MPa) | ASTM D882 | 3978 | 3695 | 2593 |
| Puncture Resistance (N/mm) | ASTM D3763 | 805 | 1150 | 713 |
| Oxygen Transmission Rate ($cm^3$ *20 μm/$m^2$-day-bar) | ASTM D3985 | 20.4 | 26.5 | 31.2 |

All films describe a strong, ductile, puncture resistant film. However, PA66-s-6 (10 wt % 6) demonstrated an approximately 40% higher puncture resistance, which is significant. This result illustrates the potential to downgauge the polyamide layer in a final package (i.e, coffee package or stand up pouch) while delivering the same level of puncture resistance.

Table 3 displays property comparisons for PA66-s-6 (10 wt % 6) versus a stretch ratio employing a stretching temperature of 220° C., a 3-second annealing time, and a 3%-relaxation time.

TABLE 3

| Property @ 23° C., 50% RH 15 micron, biaxially oriented film, stretched at 220° C. | Test Method | PA66/6 (10 wt % PA6) @ 3 × 3 | PA66/6 (10 wt % PA6) @ 3.5 × 3.5 | PA66/6 (10 wt % PA6) @ 4 × 4 |
|---|---|---|---|---|
| Tensile Strength MD (MPa) | ASTM D882 | 320 | 252 | 280 |
| Tensile Strength TD (MPa) | ASTM D882 | 307 | 253 | 315 |
| % Elongation @ Break (MD) | ASTM D882 | 83 | 82 | 66 |
| % Elongation @ Break (TD) | ASTM D882 | 77 | 63 | 58 |
| Young's Modulus MD (MPa) | ASTM D882 | 4475 | 3472 | 3455 |
| Young's Modulus TD (MPa) | ASTM D882 | 4469 | 3407 | 3959 |
| Puncture Resistance (N/mm) | ASTM D3763 | 963 | 942 | 1023 |
| Oxygen Transmission Rate ($cm^3$ *20 μm/$m^2$-day-bar) | ASTM D3985 | 23.8 | — | — |

Interestingly, the puncture resistance for the 10% copolymer was not significantly enhanced from 3×3 to 4×4, as is seen for the 23% 6 copolymer. This appears to be the result of higher % crystallinity and a higher order for the 10% copolymer (35% crystalline vs 25% crystalline for the 23% 6 copolymer). Effectively, the PA66-s-$6_{10}$ copolymer has three main advantages over PA6 in the form of biaxially oriented nylon: (1) It allows for 25% higher stretch ratios (higher yields, enhances potential throughput by 75%); (2) a 25° C. higher melting point; and (3) 30-40% higher puncture resistance.

Table 4 displays property comparisons for PA66-s-6 (23 wt % 6) versus a stretch ratio employing a stretching temperature of 200° C., a 3-second annealing time, and a 3%-relaxation time. As demonstrated, the PA66-s-6 copolymer shows enhanced properties as the film is capable of being stretched to a greater extent. This ability to stretch to a 25% greater ratio in MD and TD enhances line speeds and the added puncture resistance allows for potential down gauging of the film.

TABLE 4

| Property @ 23° C., 50% RH 15 micron, biaxially oriented film, stretched at 220° C. | Test Method | PA66/6 (23 wt % PA6) @ 3 × 3 | PA66/6 (23 wt % PA6) @ 3.5 × 3.5 | PA66/6 (23 wt % PA6) @ 4 × 4 |
|---|---|---|---|---|
| Tensile Strength MD (MPa) | ASTM D882 | 261 | 288 | 307 |
| Tensile Strength TD (MPa) | ASTM D882 | 248 | 278 | 272 |
| % Elongation @ Break (MD) | ASTM D882 | 100 | 84 | 76 |
| % Elongation @ Break (TD) | ASTM D882 | 96 | 85 | 59 |
| Young's Modulus MD (MPa) | ASTM D882 | 2713 | 3166 | 3043 |
| Young's Modulus TD (MPa) | ASTM D882 | 2741 | 2970 | 2919 |
| Puncture Resistance (N/mm) | ASTM D3763 | 726 | 869 | 929 |
| Oxygen Transmission Rate ($cm^3$ *20 µm/$m^2$-day-bar) | ASTM D3985 | 29.9 | — | 26.8 |

The significance of the results in this table is that a higher level of orientation enhances the key property of puncture resistance for the 23 wt % 6 copolymer. At 4×4, this copolymer has higher puncture resistance than a traditional biaxially oriented polyamide. As before, the traditional polyamide is limited to lower stretch ratios closer to 3×3.

Table 5 displays stretch ratios comparing PA66/6 copolymers to PA6 for simultaneously stretched films. At a preferred stretching temperature of 200° C., the copolymers show in excess of 25% greater stretching in the machine and transverse directions. This higher degree of stretching equates to improved yields and throughput potential on a commercial BOPA line.

TABLE 5

| Sample | Temp (C.) | Condition | Stretch Ratio |
|---|---|---|---|
| PA6 | 160 | Dry | 3.3 × 3.3 |
|  |  | Wet | 3 × 3 |
|  | 200 | Dry | 3.9 × 3.9 |
|  |  | Wet | 3.4 × 3.4 |
| PA6/66 | 160 | Dry | 4.0 × 4.0 |
|  |  | Wet | 3.7 × 3.7 |
| 75F | 160 | Dry | 3.9 × 3.9 |
|  |  | Wet | 3.3 × 3.3 |
|  | 200 | Dry | 4.4 × 4.4 |
|  |  | Wet | 4.3 × 4.3 |
| 75B | 160 | Dry | 3.6 × 3.6 |
|  |  | Wet | 3.3 × 3.3 |
|  | 200 | Dry | 3.7 × 3.7 |
|  |  | Wet | 3.4 × 3.4 |
|  | 220 | Dry | 4.4 × 4.4 |
|  |  | Wet | 4.3 × 4.3 |

The significance of the results in this table is that PA66-s-6 copolymers demonstrated a unique ability to stretch substantially further than PA6. This higher degree of stretching can (1) increase yields by reducing edge scrap and (2) can enhance potential throughput at a film producer (i.e., a 9× thinning for 3×3 versus a 16× thinning for 4×4 requires 16/9=1.75 to maintain the specific thickness). Regarding point number 2, a biax Nylon manufacturer can enhance their potential lb produced/machine from 10 Mlb to 17.5 Mlb/year. This translates into more money per film line or the ability to have more downtime/less stretching equipment required for the same amount of film.

Sequentially Stretched Films.

PA66-s-6 films were sequentially oriented on a pilot line at Parkinson Technologies in Woonsocket, R.I. Typical processing conditions included: single screw extrusion temperatures at approximately 260 to 280° C.; die temperatures at approximately 260 to 280° C.; cast roll temperatures at approximately 25 to 40° C.; machine direction stretching temperatures at approximately 50 to 70° C.; transverse or cross direction stretching temperatures at approximately 90-120° C.; and annealing temperatures at approximately 180-210° C.

Film thicknesses produced were 10-25 microns using stretch ratios of 3× in the machine direction and 4-4.3× in the transverse direction. They were subsequently tested for tensile strength (ASTM D882), puncture resistance (ASTM F1307), 45 degree gloss (ASTM D523), and % haze/clarity measurements (ASTM D1003).

Table 6 below displays properties for sequentially stretched, machine direction followed by transverse direction, film made from PA66-s-6 copolymers (10% 6 and 23% 6 content). The significance of this table is that PA66-s-6 copolymers can be stretched to produce strong, transparent, glossy, puncture resistant films. Being able to sequentially stretch in addition to simultaneous stretching results shown above opens up opportunities in the market; some companies have equipment that stretches in a sequential fashion and some have equipment that stretches in a simultaneous fashion.

Further interesting information gathered from sequential stretching is that both the 10% and 23% 6 content levels show equivalent properties (tensile and puncture) which suggests that the crystal alignment is similar. Both materials exhibit high tensile strength (approximately 250 MPa) and puncture resistance (approximately 1800-2600 N/mm). These values are roughly 2× those reported in simultaneously stretched film, which is likely a result of the puncture tests being slightly different. The identified ASTM method cited in Table 6 uses a puncture probe radius of 1.6 mm is used versus 1 mm for the simultaneously stretched film. The simultaneous stretched film was tested in house at Bruckner, and they have adopted a smaller puncture probe radius for analyzing via pinhole.

As depicted in FIG. 18, the enhanced yield piece is related to a higher percentage of film being used and not scrapped copolymer film (4×4), where the initial cast width is constant, approximately 16/9=1.78 or 78% more material can be processed for the PA66-s-6 copolymer. In terms of volume, this result could allow a biaxial Nylon film producer who is currently producing 10 Mlb/year per line to now produce 17.8 Mlb/year per line. Further, it adds flexibility for down time to achieve a desired volume of film per unit time.

TABLE 6

| Property @ 23 C., 50% RH Sequential biaxially oriented Nylon, thickness = 15 micron | Test Method | Nylon 6 | PA66-s-6 (10% 6 content), 2.9 × 4 stretch (MD × TD), 375 F. annealing, 15% relaxation | PA66-s-6 (10% 6 content), 2.9 × 4 stretch (MD × TD), 385 F. annealing, 15% relaxation | PA66-s-6 (10% 6 content), 3.2 × 4.3 stretch (MD × TD), 400 F. annealing, 15% relaxation | PA66-s-6 (23% 6 content), 2.9 × 4 stretch (MD × TD), 375 F. annealing, 10% relaxation | PA66-s-6 (23% 6 content), 2.9 × 4 stretch (MD × TD), 395 F. annealing, 10% relaxation | PA66-s-6 (23% 6 content) with anti-block, 2.9 × 4 stretch (MD × TD), 395 F. annealing, 10% relaxation |
|---|---|---|---|---|---|---|---|---|
| Tensile Strength @ Max MD (Mpa) | ASTM D882 | 265 | 255 | 275 | 250 | 239 | 233 | 234 |
| Tensile Strength @ Max TD (Mpa) | ASTM D882 | 257 | 241 | 283 | 240 | 265 | 258 | 261 |
| Elongation @ Break (MD) (%) | ASTM D882 | 98 | 98 | 101 | 75 | 103 | 106 | 107 |
| Elongation @ Break (TD) (%) | ASTM D882 | 91 | 82 | 93 | 69 | 79 | 67 | 65 |
| Puncture Resistance (N/mm) | ASTM F1306 | 1820 | 1770 | 2160 | 2650 | 2590 | 2590 | 2430 |
| Oxygen Transmission Rate (cm$^3$/m$^2$-day-bar) | ASTM D3985 | — | — | — | — | 60.9 | — | 66.8 | 63.2 |
| 45 Degree Gloss (GGI) | ASTM D523 | — | 89 | 65 | 104 | 101 | 102 | 94 |
| % Transmission | ASTM D1003 | 92.0 | 92.2 | 92.1 | 92.1 | 92.2 | 92.3 | 92 |
| % Clarity | ASTM D1003 | 96.3 | 99.8 | 99.7 | 99.6 | 99.6 | 99.5 | 98.6 |
| % Haze | ASTM D1003 | 3.0 | 1.07 | 1.4 | 2.26 | 2.63 | 1.67 | 2.75 |
| Hot Air Shrink (160 C., 5 min) (MD) (%) | — | — | 7 | 1 | 2 | 7 | 2.5 | 2 |
| Hot Air Shrink (160 C., 5 min) (TD) (%) | — | — | 6 | 1 | 2 | 8 | 5 | 5 |

(% yield or usable film=[(total width−edge scrap)/total width]*100. A certain length is going to be scrapped and will remain constant regardless of whether the total width is 3 feet or 4 feet. Therefore, in a Nylon6 process where the initial cast film is 1 foot and the final stretched is 3 feet and assuming 4 inches is the total scrap, the yield is [(36−4)/36]*100=88.9% yield. In a PA66 copolymer process, where the initial cast film is 1 foot and the final stretched film is 4 foot and assuming 4 inches is the total scrap, the yield is [(48−4)/48]*100=91.7% yield. This results in a total yield increase of approximately 2.8%. Increased potential throughput is based on the assumption that there is no limit regarding the number of pounds that can be processed through a film line. Therefore, if there is an assumption that a target film thickness of 15 microns is being produced and a PA6 film (3×3) is being stretched versus a PA66-s-6

Table 7 shows a comparison between PA6 and PA66/6 (23 wt % 6) (both having a melting point of approximately 220° C.) in a seven-layer blown film construction (PA/Tie/LDPE/Tie/PA/Tie/LLDPE), with respective % distributions of 25/10/10/10/10/10/25). PA66/6 provides 2.2× the puncture resistance as PA6 and 1.9× the gloss as the outside PA layer. These results have potential benefits in generating a tougher package that is more eye pleasing. Currently, some constructions requiring higher gloss will trend away from PA use, which can sacrifice toughness and the ability to heat seal the package at a higher temperature. As a result, the food packager is limited by the rate at which his line can operate. Thus, polyamide use on the outside layer allows for higher heat sealing temps, and higher heat seals=faster sealing=faster running lines.

TABLE 7

| Property @ 23 C., 50% RH Blown Multilayer (PA/Tie/LDPE/Tie/PA/Tie/LLDPE) | Test Method | PA6 | PA66/6 (23 wt % PA6) |
|---|---|---|---|
| Tensile Strength @ Break MD (MPa) | ASTM D882 | 50.7 | 52 |
| Tensile Strength @ Break TD (MPa) | ASTM D882 | 46.4 | 50.7 |
| Secant Modulus (MD) (MPa) | ASTM D882 | 315 | 275 |
| Secant Modulus (TD) (MPa) | ASTM D882 | 368 | 307 |
| % Elongation @ Break (MD) | ASTM D882 | 470 | 530 |
| % Elongation @ Break (TD) | ASTM D882 | 485 | 570 |
| Puncture Resistance (lbs./mil) | ASTM D3763 | 6.5 | 14.6 |
| Elmendorf Tear (MD) (g) | ASTM D1922 | 1897 | 2538 |
| Elmendorf Tear (TD) (g) | ASTM D1922 | 3314 | 3239 |
| OTR @ 1 mil (cc/m2-day-atm) | ASTM D3985 | 10.0 | 9.5 |
| % Clarity | ASTM D1003 | 92.8 | 96.8 |
| % Transmission | ASTM D1003 | 92.4 | 92.5 |
| % Haze | ASTM D1003 | 20.9 | 13.2 |
| Gloss @ 45 Deg. | ASTM D2457 | 39.4 | 73.5 |

The significance of the results in Table 7 is that the PA66-s-6 copolymer provides a multilayer film construction with the same temperature performance of Nylon6 with performance boosts in clarity/haze reduction, gloss (39.4 vs 73.5) puncture resistance (6.5 vs 14.6 lb/mil), and tensile elongation. Overall, the PA66-s-6 copolymer enhances the mechanics and aesthetics of a multilayer film structure. The higher puncture resistance could allow the package producer to downgauge the Nylon layer for cost savings.

Figure 2:
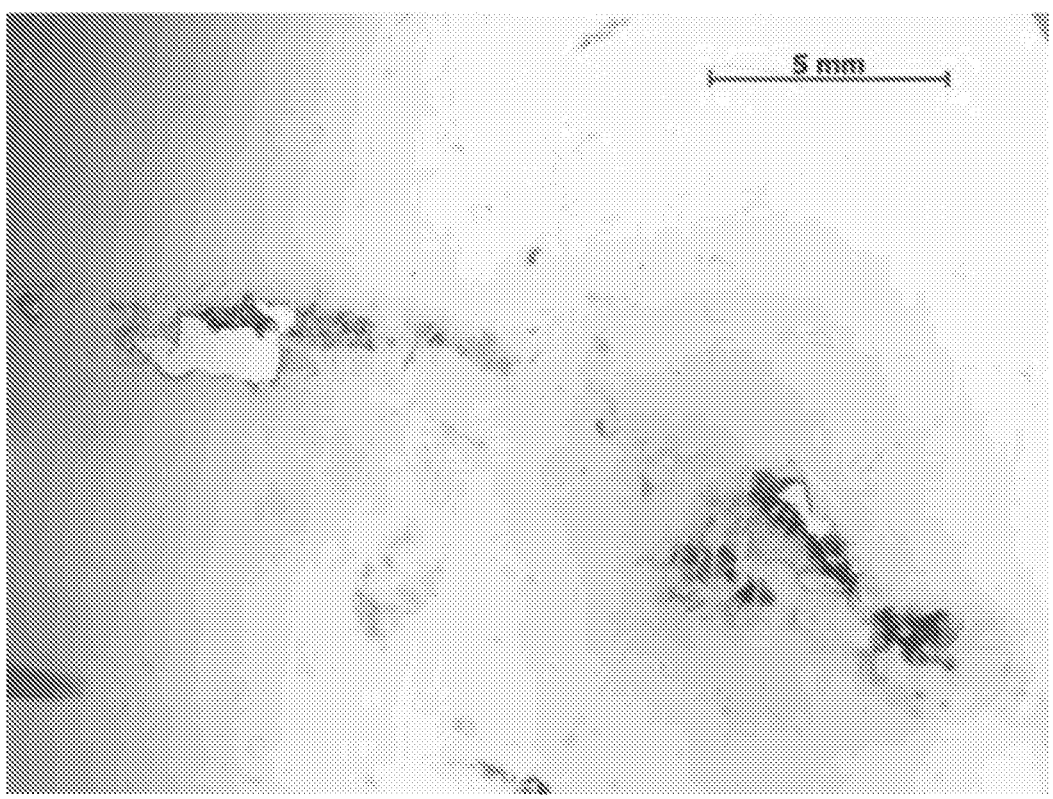
FIG. 2 illustrates an example of a burn through from a film composed of a blend of Nylon6,6 and Nylon6. The poor film homogeneity results in Nylon 6-rich regions, which leads to burn through in applications that require a higher thermal performance.

The copolyamides of the present invention containing 1-25 wt % lactam or AA-BB repeat units, such as PA66-s-6, have the benefit of a single melting point versus two melting points for conventional blends of PA66 and PA6. When produced into a final film article, dual melting points result in heterogeneity, which sacrifices performance. For example, a film prepared from a Nylon 66-s-6 copolymer has a uniform thermal performance whereas a film prepared from a Nylon6,6 and Nylon6 blend exhibits heterogeneity, resulting in pockets rich in Nylon6,6 (with a higher melting point=260° C.) and Nylon6 (with a lower melting point=220° C.). From the image seen in FIG. 2, it was shown through a combination of microscopy and spectroscopy that film subjected to heat greater than 220° C. resulted in burn through behavior and the burn through regions were shown to contain areas rich in Nylon6. In contrast, the PA66-s-6 films of the invention, which exhibit high homogeneity, show improved clarity, toughness, strength, and puncture resistance versus a film prepared from a PA66 and PA6 blend.

RESULTS AND DISCUSSION

Figure 1:
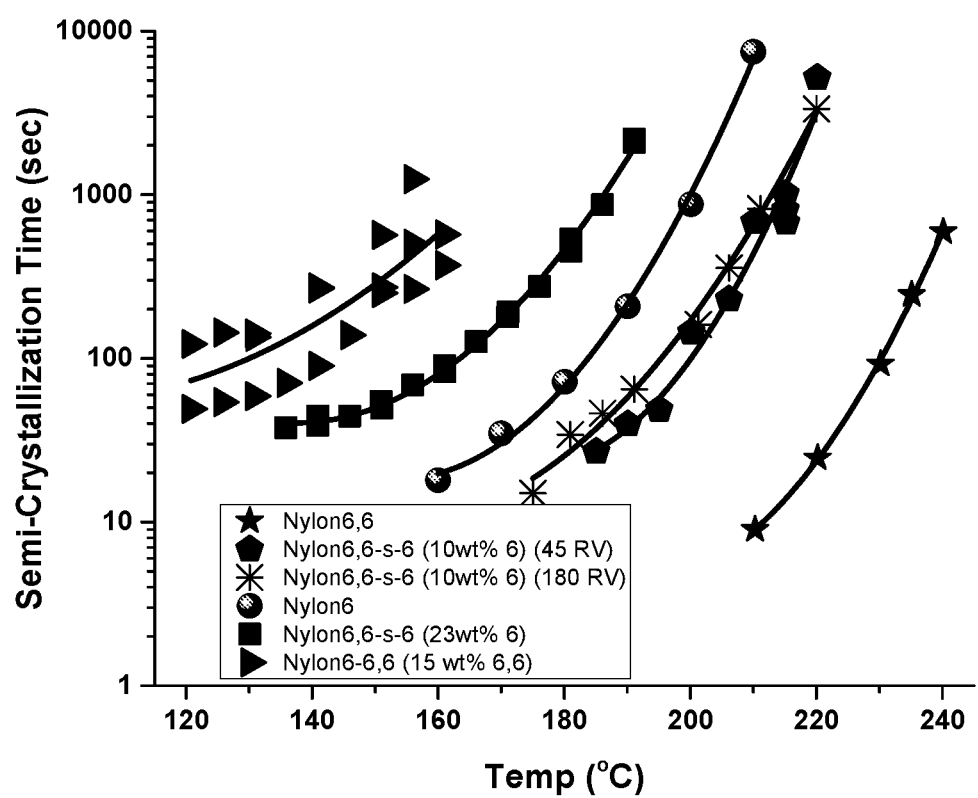
FIG. 1 illustrates a graph of semi-crystallization time (sec) versus temperature (° C.) for Nylon6,6 (★); Nylon6,6-s-6 (where 90 wt % of the copolyamide is from the 6,6 structural unit and 10 wt % is from the 6 structural unit, and RV=45) (●); Nylon6,6-s-6 (where 90 wt % of the copolyamide is from the 6,6 structural unit and 10 wt % is from the 6 structural unit, and RV=180)(*) Nylon 6 (●); Nylon6,6-s-6 (where 77 wt % of the copolyamide is from the 6,6 structural unit and 23 wt % is from the 6 structural unit) (■); and Nylon6-s-6,6 (where 85 wt % of the copolyamide is from the 6 structural unit and 15 wt % is from the 6 structural unit) (▶).

It was unexpectedly observed that the crystallization rate of PA66-s-6 copolyamides containing 75-99 wt % of Nylon6,6 repeating units was superior compared to the respective crystallization rates of Nylon6,6 and even (in more limited weight percentages) Nylon6, especially as applied to a blown or cast film. In FIG. 1, the Nylon6,6 (squares) is shown to have rapidly crystallized, where crystallization times decreased at a rapid rate in going from approximately 750 seconds to less than 10 seconds at a temperature decrease of 240° C. to 210° C. As it applies to film applications, this rapid crystallization behavior undesirably limits blow up ratios in blown film, inhibits the ability to thermoform and orient, and results in film with an undesired opalescence (opacity).

Figure 3A:
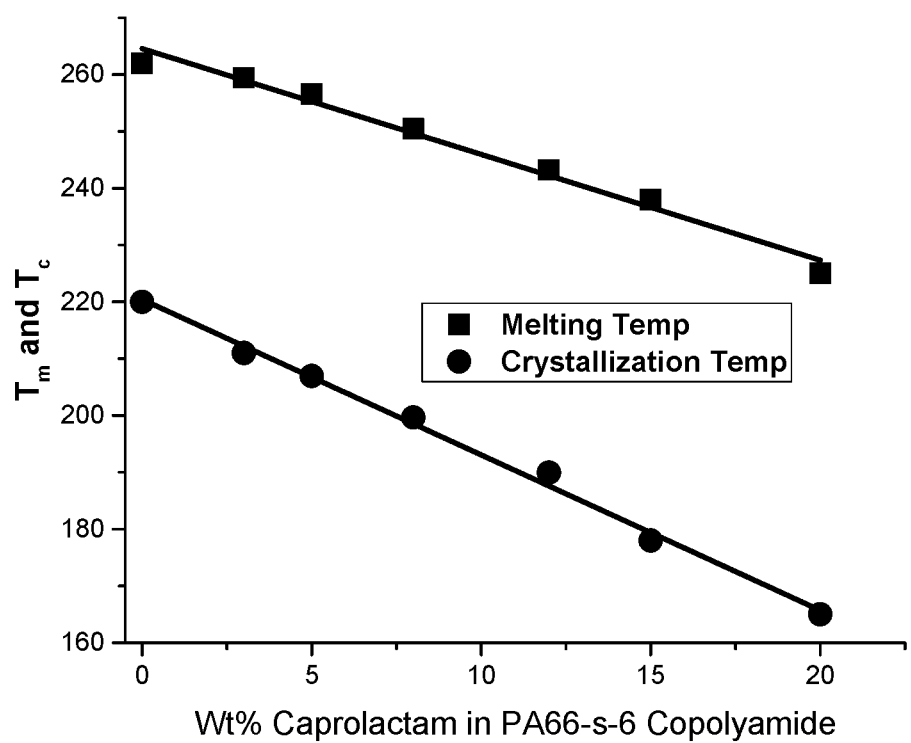
FIG. 3A illustrates the effect of caprolactam incorporation on the melting temperature ($T_m$) and crystallization temperature ($T_c$). The $T_m$-$T_c$ gap broadens with increased caprolactam incorporation. This behavior allows for a retention in high melting point, desirable for Nylon 6,6-based thermoplastics, while improving film processing through a broader processing window and decreasing crystallization rate.
Figure 3B:
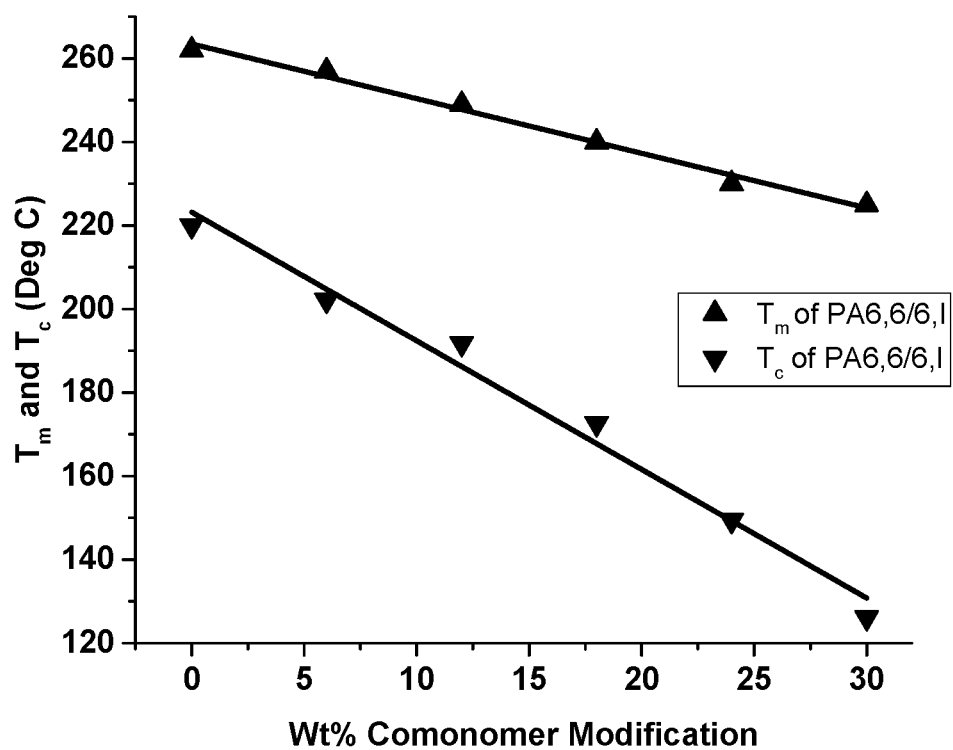
FIG. 3B illustrates a similar effect of 6,I incorporation on the $T_m$ and $T_c$ of Nylon6,6/6,I copolymers. The utility of the 6,I modification is that the stiffness of the isophthalic acid molecule coupled with its non-linearity yields a lower effect on the melting point of the PA6,6 based system but also reduces the crystallization temperature in a similar or more aggressive fashion versus PA6 modification. An amount greater than about 30% 6,I modification results in an amorphous polymer.

Through incorporation of low levels of a lactam, such as caprolactam, into the statistical copolyamide, crystallization rates were observed to significantly decrease, which translates into a differentiated solution in regard to film applications. As an example, the statistical incorporation of low amounts of caprolactam into the PA66 backbone was observed to sharply decrease the crystallization temperature more significantly compared to the melting point (FIG. 3), resulting in a larger $T_m$-$T_c$ value that translates into a larger process window for film formation, stretching through blown film (blow up ratio), orienting, and thermoforming. For example, PA66$_{90}$-s-6$_{10}$ has a $T_m$-$T_c$ value of approximately 55° C., which more closely resembles Nylon6. This broadened gap between $T_m$ and $T_c$ translates into a significantly reduced crystallization speed versus Nylon6,6. For example, the statistical copolymer with 10 wt % caprolactam shifts to a crystallization time versus temperature profile in line with Nylon6. Additionally, the rate actually becomes equivalent to Nylon6 and subsequently even slower as temperature approaches 100° C. When the crystallization rate becomes slower than Nylon6 at approximately 12 to 15 wt % caprolactam, especially at temperatures between 100-160° C., the result is lower overall % crystallinity and a reduction in spherulite size in the final produced article (e.g., film) which (1) improves film clarity (FIG. 6), (2) increases softness while not sacrificing the ultimate tensile strength of PA66, and (3) improves the ability of the article to thermoform and orient in terms of cast and blown film, the disclosed copolymers can even have elevated ultimate tensile strengths as compared to PA66 and PA6 homopolymers (FIG. 5).

In an exemplary embodiment, the copolyamide where c=90, d=5 and e=10 was tested and found to reduce % haze from 31 to 14% compared to a 75% Nylon6,6/25% Nylon6 blend at 23° C. and 50% RH, while contact clarity was increased from 42% to 94%; and tensile strength was increased from 101 MPa to 118 MPa.

In an exemplary embodiment, the copolymer where c=90, d=5 and e=10 was tested and found to exhibit a clarity equivalent to Nylon6 (94% clarity) while offering a 20-25° C. higher melting point (245° C. versus 220° C.), a higher ultimate tensile strength (118 MPa versus 60 MPa at 23° C. and 50% RH), and a higher elongation to break (420% versus 350% at 23° C. and 50% RH).

Figure 4:
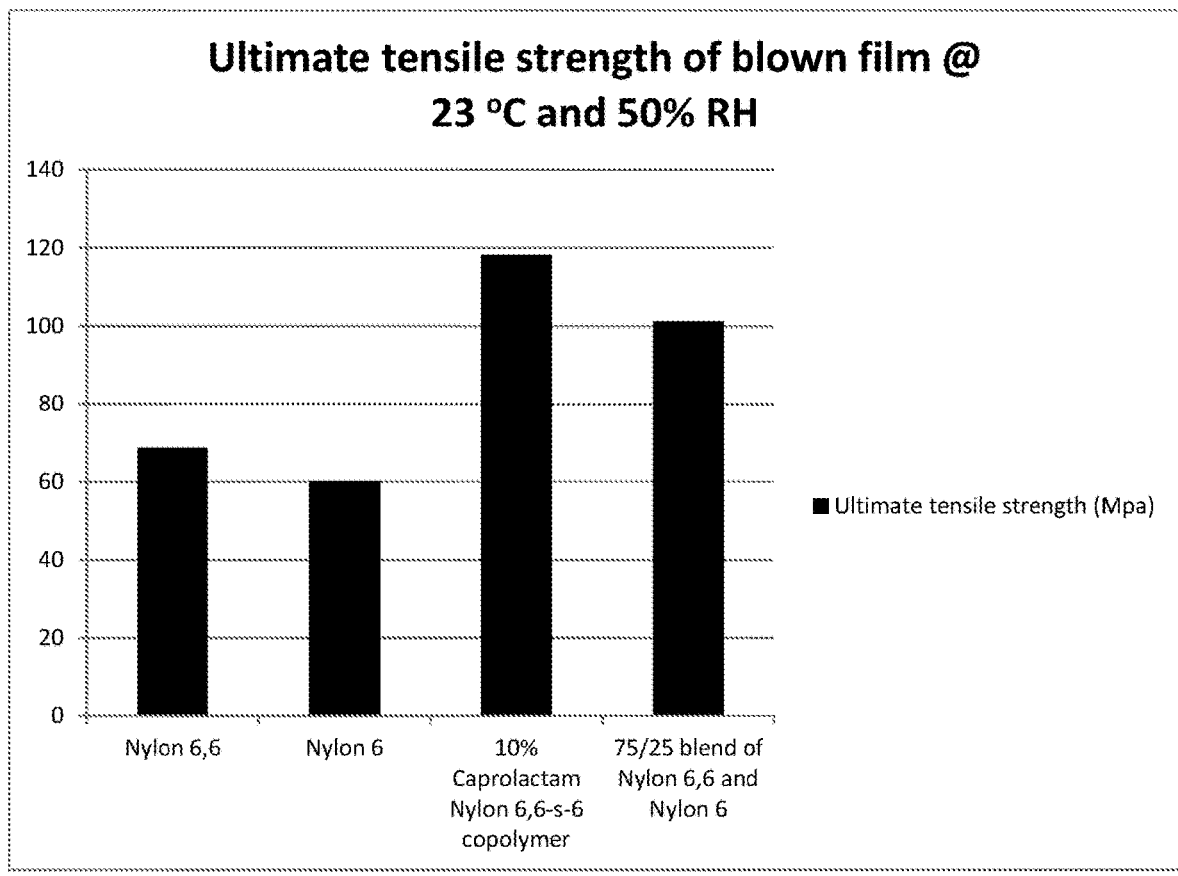
FIG. 4 reveals an ultimate tensile strength comparison of Nylon 6,6, Nylon 6, Nylon 6,6/Nylon 6 blends, and Nylon6,6-s-$6_{10}$ (10 wt % Nylon 6). Nylon6,6-s-$6_{10}$ yields a higher ultimate tensile strength versus homopolymers or blends.
Figure 5:
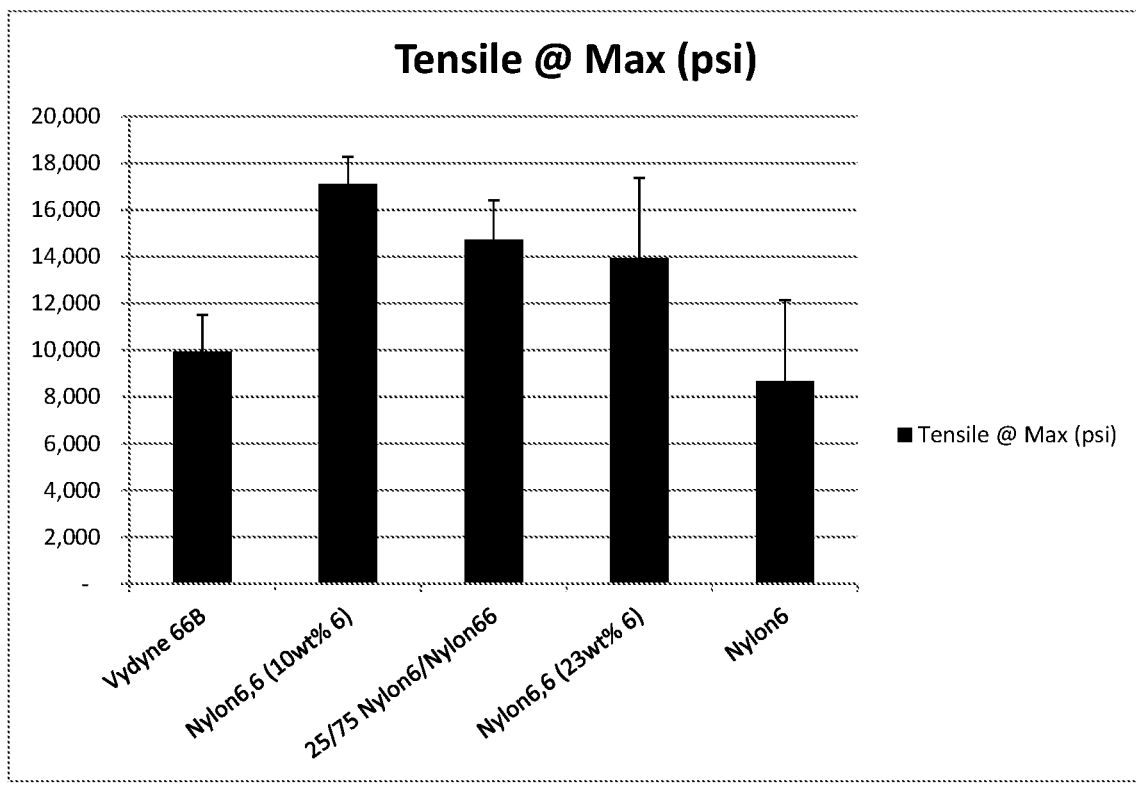
FIG. 5 reveals a tensile @ Max (psi) comparison between Vydyne 66B, Nylon 6,6 (10 wt % Nylon 6), Nylon 6/Nylon 66 (25/75), Nylon 6,6 (23 wt % Nylon 6); and Nylon 6.
Figure 6:
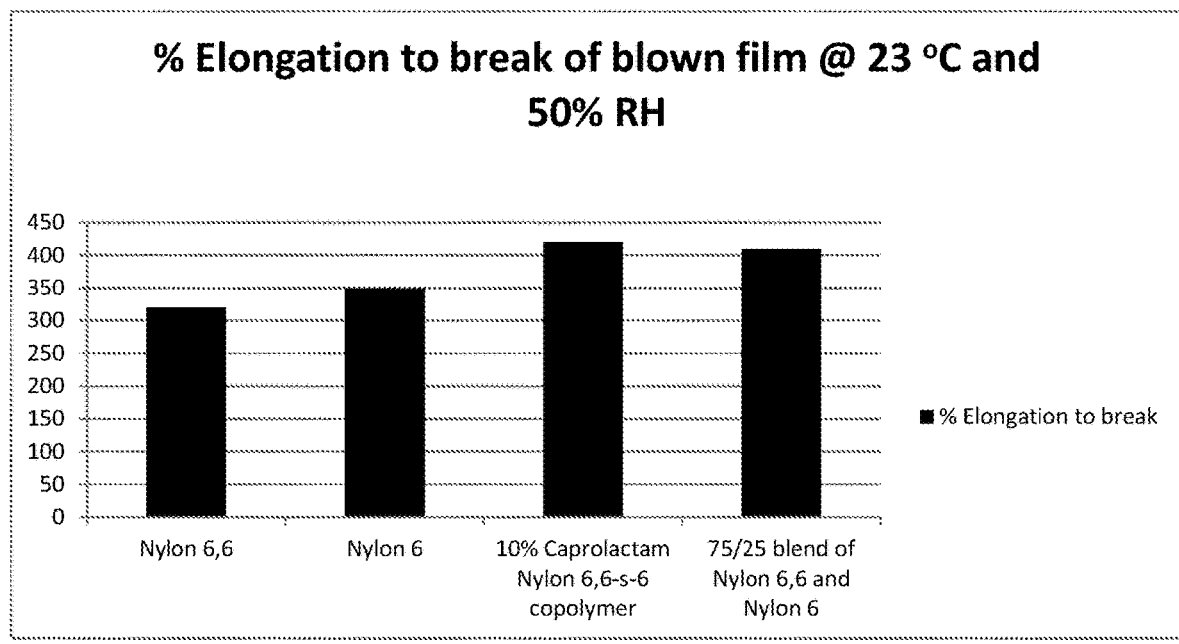
FIG. 6 shows elongation to break comparisons of blown film samples for Nylon6,6, Nylon6, Nylon6,6/Nylon 6 blends, and Nylon6,6-s-$6_{10}$ (10 wt % Nylon6). Nylon6,6-s-$6_{10}$ blown film yields a higher elongation to break versus homopolymers or blends.
Figure 7:
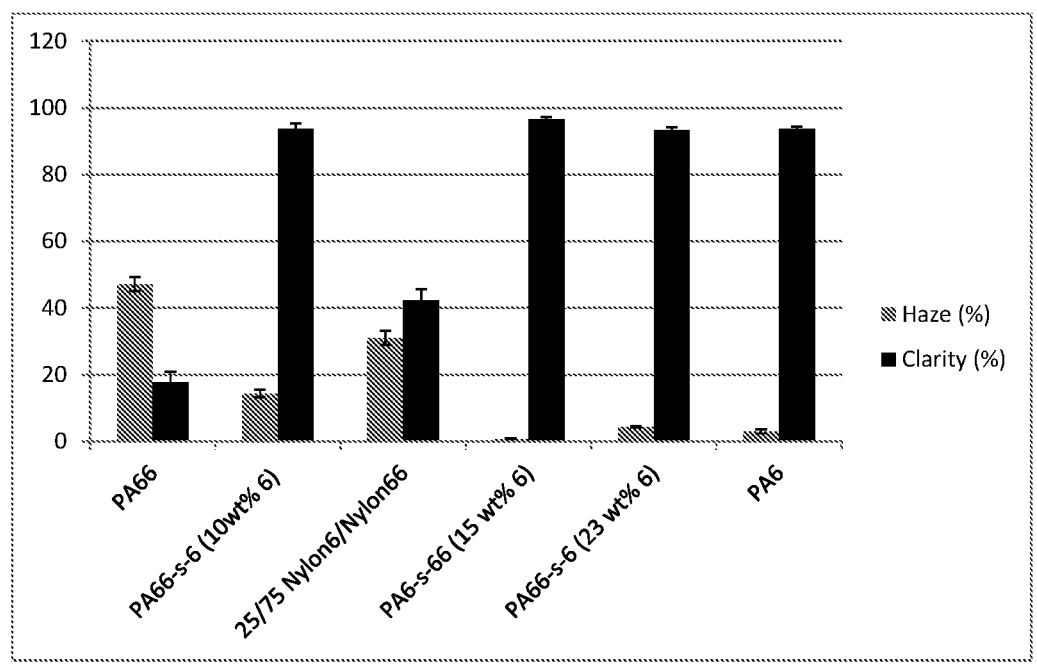
FIG. 7 shows % clarity and % haze of blown film samples for Nylon6,6; Nylon6; a 25/75 Nylon6,6/Nylon 6 blend; Nylon6,6-s-$6_{10}$ (10 wt % Nylon 6 Nylon6-s-66 (15 wt % 6); and Nylon66-s-6 (23 wt % 6).); The Nylon6,6-s-$6_{10}$.

From FIGS. 4, 5 and 6, it is apparent that the incorporation of 10 wt % caprolactam into Nylon6,6 results in a PA66-s-6 copolymer that exhibits attractive properties that augment its high melting point (245° C.), making it a unique solution from a film applications standpoint. Key properties are film modulus and high elongation before breaking while maintaining high puncture resistance (approximately 2000 g/inch required to break in the Dart Drop test, which is improved versus Nylon6,6), tear strength, and tensile strength (100-120 MPa, which is similar to Nylon6,6 and notably improved versus approximately 80-90 MPa for Nylon6) that make, for example, PA66-based resins an attractive solution for film manufacturers. The material softness, which results from the decreased modulus (550-600 MPa versus 1000-1100 MPa for Nylon6,6) provides improved modulus matching with softer materials that are typically employed in a multilayer film (e.g., polyethylene and polypropylene) and which can reduce undesirable film curling. Curling is also improved through the reduction in crystallization rate. Furthermore, to generate all the desired traits of polyamide film with higher thermal performance, manufacturers often pellet blend Nylon6 with Nylon6,6. However, when doing this, one compromises film clarity (see FIG. 7) and thermal homogeneity (see FIG. 8). The disclosed copolyamides alleviate the compromises of pellet blending while improving the processing in terms of crystallization rate reduction and a decreased processing temperature which can lead to a reduction in plate out from caprolactam monomer or processing aides (i.e., Acrawax).

In addition to the above described superior processing behavior and mechanical properties of the disclosed PA66-s-6 copolyamides, potential cleanliness is also improved versus Nylon6, Nylon6-based copolyamides, and blends of Nylon6,6 and Nylon6. As previously described, caprolactam can be thermally reversible at temperatures above 210° C., approaching an equilibrium monomer concentration of approximately 10 wt % at 300° C. Therefore, PA66-rich copolymers have a significant advantage compared to Nylon6-based solutions (Nylon6 and blends of Nylon6,6 and Nylon6) because they contain a reduced amount of caprolactam (specifically related to Nylon6 that is 100% caprolactam-based) and can be processed at notably lower temperatures than Nylon6,6 and Nylon6 blends (250-270° C. versus 280-300° C.).

All patents/publications cited herein are incorporated by reference in their entireties.

The invention claimed is:

1. A copolyamide composition comprising a copolyamide of Formula (4) or Formula (5)

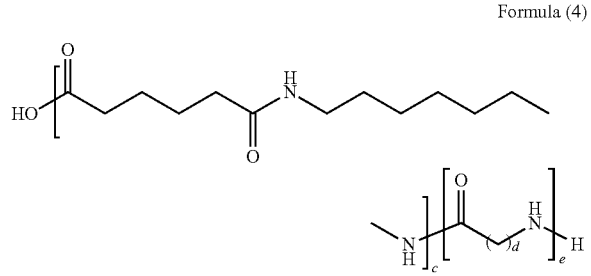

Formula (4)

wherein in Formula (4):
c=75-99 wt %;
d=4 or 6-12, where the methylene groups are unsubstituted; and
e=1-25 wt %;

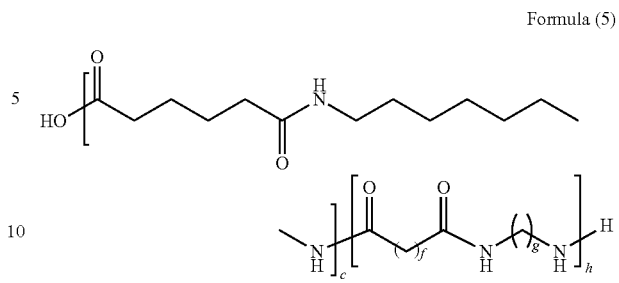

Formula (5)

wherein in Formula (5):
c=75-99 wt %;
f=2-3 or 5-16;
g=2-4 or 7-16, where the methylene groups are unsubstituted; and
h=1-25 wt %,
wherein the copolyamides of Formula (4) and Formula (5) each has a relative viscosity according to ASTM D789 (9.34) in a range of 60-350 and a melting point greater than 220° C.

2. The copolyamide composition according to claim 1, further comprising a final copper concentration of greater than 60 ppm and less than 500 ppm.

3. The copolyamide composition according to claim 1, further comprising a lubricant selected from the group consisting of aluminum distearate, zinc stearate and calcium stearate.

4. The copolyamide composition according to claim 3, wherein the lubricant is at a concentration of between 500 and 1,000 ppm.

5. The copolyamide composition according to claim 1, further comprising an anti-block agent selected from the group consisting of N,N'-ethylene bis-steramide and stearyl erucamide.

6. The copolyamide composition according to claim 5, wherein the anti-block agent is at a concentration of between 1,000 and 2,000 ppm.

7. The copolyamide composition according to claim 1, further comprising an anti-block agent that is diatomaceous earth.

8. The copolyamide composition according to claim 1 where c is 90 and e is 10 for the copolyamide of Formula (4), and wherein the copolyamides of Formula (4) and Formula (5) each has a relative viscosity of 90-230.

9. The copolyamide composition according to claim 8, wherein the relative viscosity is 100-200.

10. The copolyamide composition according to claim 1 where c is 90 and h is 10 for the copolyamide of Formula (5), and wherein the copolyamides of Formula (4) and Formula (5) each has a relative viscosity of 90-230.

11. The copolyamide composition according to claim 10, wherein the relative viscosity is 100-200.

12. A cast film comprising the copolyamide composition according to claim 1.

13. The cast film according to claim 12 and having an ultimate tensile strength of greater than 100 MPa and less than 140 MPa, an elongation to break of greater than 350% and less than 600%, a tear strength according to ASTM D1922 of greater than 50 grams and less than 150 grams, a Dart drop puncture resistance according to ASTM D1709 of greater than 2,000 grams, and an oxygen transmission rate of no greater than 1.5 cm$^3$/100 in$^2$-day-atm.

14. The copolyamide composition according to claim 1, wherein the copolyamides of Formula (4) and Formula (5)

each has a crystallization rate of at least 10× slower than a PA66 homopolymer at less than or equal to 200° C. and an overall isothermal crystallization behavior substantially similar to Nylon6.

15. The copolyamide composition according to claim 1, wherein the copolyamides of Formula (4) and Formula (5) each has a crystallization rate of at least 20× slower than a PA66 homopolymer at less than or equal to 200° C.

16. The copolyamide composition according to claim 14, wherein the copolyamides of Formula (4) and Formula (5) each has a semi-crystallization rate less than Nylon6 while possessing a melting point of at least 15° C. greater than Nylon6.

17. The copolyamide composition according to claim 1, wherein the copolyamides of Formula (4) and Formula (5) each exhibits biaxial orientation allowing for at least 25% greater stretching ability, a higher melting point, and up to 40% greater puncture resistance than Nylon6.

18. A blown film comprising the copolyamide composition according to claim 1.

19. A biaxially oriented film comprising the copolyamide composition according to claim 1.

20. The copolyamide composition according to claim 1, wherein the copolyamides of Formula (4) and Formula (5) each has a biaxial orientation sufficient to cause a greater stretching ability, a higher melting point, and greater puncture resistance than Nylon6.

21. The copolyamide composition according to claim 1, wherein the copolyamide is of Formula (4).

22. The copolyamide composition according to claim 1, wherein the copolyamide is of Formula (5).

* * * * *